US012734548B2

(12) United States Patent
Crudden et al.

(10) Patent No.: US 12,734,548 B2
(45) Date of Patent: Sep. 15, 2026

(54) METHOD OF SELECTIVE DEPOSITION OF SMALL MOLECULES ON METAL SURFACES

(71) Applicants: Queen's University at Kingston, Kingston (CA); The University of Western Ontario, London (CA); Université Laval, Quebec (CA)

(72) Inventors: Cathleen M. Crudden, Kingston (CA); Seán Barry, Ottawa (CA); Paul Ragogna, Stratford (CA); Ishwar Singh, Brampton (CA); Alex Jeffrey Veinot, Middleton (CA); Eden Ramona Goodwin, Ottawa (CA); Peter George Gordon, Ottawa (CA); Tianchi Zhang, Jiande (CN); Peter McBreen, Québec (CA); Justin Lomax, London (CA)

(73) Assignees: Queen's University at Kingston, Kingston (CA); The University of Western Ontario, London (CA); Université Laval, Quebec City (CA)

( * ) Notice: Subject to any disclaimer, the term of this patent is extended or adjusted under 35 U.S.C. 154(b) by 0 days.

(21) Appl. No.: 18/137,538

(22) Filed: Apr. 21, 2023

(65) Prior Publication Data

US 2023/0381812 A1 Nov. 30, 2023

Related U.S. Application Data

(60) Provisional application No. 63/333,190, filed on Apr. 21, 2022.

(51) Int. Cl.
*C23C 16/00* (2006.01)
*B05D 1/00* (2006.01)
(Continued)

(52) U.S. Cl.
CPC ............... *B05D 1/60* (2013.01); *B05D 3/142* (2013.01); *B05D 7/56* (2013.01); *B05D 2202/00* (2013.01); *B05D 2203/30* (2013.01)

(58) Field of Classification Search
CPC ...................................................... C23C 16/00
See application file for complete search history.

(56) References Cited

U.S. PATENT DOCUMENTS

2012/0100722 A1* 4/2012 Asai .................... H01L 21/0337 438/758
2012/0323008 A1* 12/2012 Barry ........................ C07F 1/00 206/524.1

(Continued)

FOREIGN PATENT DOCUMENTS

EP 2707375 3/2014

OTHER PUBLICATIONS

"Synthesis of new stable carbenes from the corresponding 1,3-dialkylimidazolium and benzimidazolium salts" O.V. Starikova, G.V. Dolgushin, L.I. Larina, T.N. Komarova, V.A. Lopyrev, ARKIVOC (xiii) 119-124. (Year: 2003).*

(Continued)

*Primary Examiner* — Gordon Baldwin
*Assistant Examiner* — Mohammad Mayy
(74) *Attorney, Agent, or Firm* — Angela Lyon

(57) ABSTRACT

A method of selective deposition that includes disposing in a deposition chamber a patterned substrate of side-by-side areas of metal and dielectric. The deposition chamber is connected to a bubbler that contains an N-heterocyclic carbenes (NHC) precursor. By heating the bubbler, gaseous free NHC is generated which is pulsed into the deposition chamber, where the NHC selectively chemisorbs onto the (Continued)

metal surface. Annealing after deposition of NHC improves surface patterning by removing stray metal from the dielectric section.

34 Claims, 14 Drawing Sheets

(51) Int. Cl.

| | |
|---|---|
| ***B05D 3/14*** | (2006.01) |
| ***B05D 7/00*** | (2006.01) |

(56) References Cited

U.S. PATENT DOCUMENTS

| | | | | |
|---|---|---|---|---|
| 2015/0086460 | A1* | 3/2015 | Kim | C23C 18/143 427/532 |
| 2016/0199875 | A1 | 7/2016 | Crudden et al. | |
| 2016/0307747 | A1 | 10/2016 | Shestopalov et al. | |
| 2017/0073361 | A1 | 3/2017 | Barry et al. | |
| 2018/0233350 | A1* | 8/2018 | Tois | H01L 21/02181 |
| 2021/0070783 | A1* | 3/2021 | Odedra | C23C 16/40 |

OTHER PUBLICATIONS

International Search Report and Written Opinion for PCT/CA2023/050541 filed on Apr. 21, 2023.

Shahmohammadi et al., "Recent Advances in Theororectical Development of Thermal Atomic Layer Deposition: A Review", Nanomaterials (Basel), Mar. 1, 2022, vol. 12 (5), pp. 831.

* cited by examiner

METHOD OF SELECTIVE DEPOSITION OF SMALL MOLECULES ON METAL SURFACES

RELATED APPLICATION

This application claims the benefit of the filing date of U.S. Provisional Patent Application No. 63/333,190, filed on Apr. 21, 2022, the content of which are incorporated herein by reference in its entirety.

FIELD

The present application pertains to the field of vapour phase deposition.

BACKGROUND

Self-assembled monolayers (SAMs) on metals have potential application in sensing, electrochemistry, drug delivery, surface protection, microelectronics and micro-electromechanical systems. SAMs of carbon-based ligands known as N-heterocyclic carbenes (NHCs) have been studied (see Crudden, C. M., et al., *Nature Chemistry* 2014, 6, 409).

NHCs have played a significant role in the field of transition metal complexes. Unlike most carbenes, which are reactive with limited stability, NHCs typically have one or two heteroatoms adjacent to a carbene carbon. These heteroatoms increase NHCs' stability such that they can usually be prepared on a gram scale, crystallized or distilled, and stored for long periods of time (4 years, when stored under $N_2$ in a freezer). An Au—NHC bond is estimated to be on an order of 90 kJ/mol stronger than a corresponding Au-phosphine bond, and twice as strong as metal sulfide bonds in molecular complexes [P. Pyykkö, et al. *Chem. Asian J.* 1, 623 (2006)]. As such, NHCs have potential to be valuable ligands for protecting and functionalizing gold and other metal substrates and/or surfaces.

Mobile phones, computers and all modern communications infrastructure derive function from microprocessors manufactured with integrated circuits containing thousands to billions of transistors. As device size decreases, so must the size of microprocessors, creating extreme manufacturing and design challenges. Modern integrated circuits are manufactured in three dimensions by depositing alternating conducting and insulating layers in a 3D arrangement to achieve maximum function in minimum size. Complex masking, depositing, and etching steps are needed to generate these 3D patterns. As sizes become smaller, mask misalignment and pinhole defects lead to significant performance losses. Area selective atomic layer deposition (AS-ALD) is a promising alternative for device construction, in which molecules are employed to mask substrates and/or surfaces. Molecular arrangement is achieved through the principles of self-assembly and preferential binding (i.e., the use of molecules that bind selectively to metals or to insulators). This technique allows patterning over large areas. It can theoretically produce patterns with molecular-level precision if sufficiently selective binding is achieved and the patterns are stable during the manufacturing process (Franzen, S., *Chemical Physics Letters* 2003, 381, 315, and Vericat, C., et al. *Physical Chemistry Chemical Physics* 2005, 7, 3258). Ligands that bind to metals and survive harsh manufacturing conditions are challenging to find.

SUMMARY

In one aspect the invention provides a method of selective deposition, comprising disposing a patterned substrate in a deposition chamber, wherein the patterned substrate comprises a metal surface, and a non-metal or metal oxide surface, and wherein the deposition chamber comprises a valve-controlled inlet for a carrier gas, a furnace, wherein the carrier gas has valve-controlled access to a bubbler that contains an NHC precursor, heating and maintaining the bubbler at a sufficiently high temperature to generate gaseous free carbene that collects in a headspace of the bubbler, intermittently pulsing carrier gas that includes gaseous NHC into the heated deposition chamber and purging the deposition chamber with carrier gas, and wherein the NHC selectively chemisorbs onto the metal surface, and substantially no NHC chemisorbs onto the non-metal or metal oxide surface.

In one aspect, the invention provides a method of deposition, comprising disposing a substrate in a deposition chamber, wherein the substrate comprises at least a metal surface, and wherein the deposition chamber comprises a valve-controlled inlet for a carrier gas, and wherein the carrier gas has valve-controlled access to a bubbler that contains an NHC precursor, heating and maintaining the bubbler at a sufficiently high temperature to generate gaseous free carbene that collects in a headspace of the bubbler, intermittently pulsing carrier gas that includes gaseous NHC into the deposition chamber and purging the deposition chamber with carrier gas, and wherein the NHC chemisorbs onto the metal surface.

In one embodiment of the above aspects, the pulsing is opening the gas inlet valve for a selected time for a selected number of cycles. In one embodiment the number of cycles is about 100. In one embodiment the cleaning the metal surface comprises exposing it to hot plasma. In one embodiment, the hot plasma is a plasma of $H_2$ at about 400° C. In one embodiment, the metal surface is a monolayer. In one embodiment, the metal surface is thick enough to exhibit bulk properties. In one embodiment, the metal is thick enough to exhibit bulk properties. In one embodiment, the metal surface is between 0.5 to 1 000 nm thick. In one embodiment, the metal is between 0.5 to 1 000 nm thick. In one embodiment, the metal surface is between 25 and 150 nm thick. In one embodiment, the metal is between 25 and 150 nm thick. In one embodiment, the metal surface is about 100 nm thick. In one embodiment, the metal is about 100 nm thick. In one embodiment the selected deposition temperature is in a range of about room temperature to about 500° C. In one embodiment, the selected deposition temperature is in a range of about 30 to about 200° C. In one embodiment, the deposition chamber is suitable for holding wafers. In one embodiment, the deposition chamber maintains a vacuum in a range of about 0.1 torr to about 5 torr. In one embodiment, the deposition chamber maintains a vacuum of about 3 torr. In one embodiment, the carrier gas is nitrogen or argon. In one embodiment, the nitrogen is 99% pure. In one embodiment, the nitrogen is 99.999% pure. In one embodiment, the purging the deposition chamber with carrier gas is performed for about 20 seconds. In one embodiment, the NHC chemisorbs onto the metal surface as a monolayer. In one embodiment, the NHC chemisorbs onto the metal surface as a bilayer. In one embodiment, the NHC chemisorbs onto the metal surface as a multilayer. In one embodiment, the method includes a step of cooling the deposition chamber to room temperature while continuously purging the deposition chamber with carrier gas. In one embodiment, the cooling and purging are conducted for 1 hour. In one embodiment, the method further comprises purging the deposition chamber with carrier gas. In one embodiment, the non-metal or metal oxide is a dielectric. In one embodiment, the non-metal or metal oxide comprises $SiO_2$, $Si_3N_4$, $Al_2O_3$, $Si_wO_xN_y$ wherein w is 0 to 3, x is 0 to 2 and y is 0 to 4, $HfO_2$, or any combination thereof.

In one embodiment, the method further includes removal of the NHC by thermal desorption to regenerate a pristine metal surface. In one embodiment, the NHC is 1,3-dialkylbenzimidazol-2-ylidene, where the alkyl is a C1-C6 aliphatic moiety that is branched or linear. Non-limiting examples of such NHCs include: 1,3-diisopropylbenzimidazol-2-ylidene ($1^{iPr}$), 1,3-diisopropyl-5-(trifluoromethyl) benzimidazol-2-ylidene ($1^{iPr}$-$CF_3$); 1,3-ditertbutylbenzimidazol-2-ylidene ($2^{tBu}$); and 1,3-diethylbenzimidazol-2-ylidene ($3^{Et}$), see Table 1. In one embodiment, the metal surface comprises Au, Cu, Ag, Ru, W, Ni, Fe, Mo, Co, Pt, Pd, or alloys such as bronze and steel. In one embodiment, the metal surface of a patterned substrate comprises Au, Cu, Ag, Ru, W, Ni, Fe, Mo, Co, Pt, Pd, or alloys such as bronze and steel. In one embodiment, the metal surface of the substrate comprises Au, Cu, Ag, Ru, W, Ni, Fe, Mo, Co, Pt, Pd, or alloys such as bronze and steel. In one embodiment, the NHC precursor is a salt of NHC. In one embodiment, the NHC precursor is a bicarbonate salt. In one embodiment, the NHC precursor is a carbonate salt of NHC. In one embodiment, the NHC precursor is an azolium carboxylate zwitterion. In one embodiment, the NHC precursor is an alkylcarboxylate salt of NHC. where alkyl is an aliphatic moiety (e.g, methyl, ethyl, propyl). In one embodiment, the NHC precursor is an arylcarboxylate salt of NHC, where aryl is an aromatic moiety (e.g, phenyl, tolyl, etc.). In one embodiment, the NHC precursor is a salt of NHC that comprises an anion selected from the group consisting of bicarbonate, carbonate, halide, triflate, pseudohalide, cyanide, and azide. In one embodiment, the method further includes a step of treating the substrate to refine the interface between the metal surfaces, and the non-metal or metal oxide surfaces. In one embodiment, the treating the substrate comprises thermal annealing or plasma treatment. In one embodiment, the NHC precursor is a salt of $1^{iPr}$; a salt of $1^{iPr}$-$CF_3$; a salt of $2^{tBu}$; or a salt of $3^{Et}$.

In one embodiment, the method further includes cleaning the substrate prior to the deposition of NHC. In one embodiment, the method further includes modifying the temperature of the deposition chamber to a selected deposition temperature if the deposition temperature differs from a temperature of cleaning. In one embodiment, the method further includes evacuating the deposition chamber such that it is under vacuum prior to the deposition of NHC. In one embodiment, the method further comprises annealing the substrate after NHC deposition.

BRIEF DESCRIPTION OF THE DRAWINGS

For a better understanding of the invention and to show more clearly how it may be carried into effect, reference will now be made, by way of example, to the accompanying drawings, wherein.

DETAILED DESCRIPTION OF EMBODIMENTS

Figure 1A:
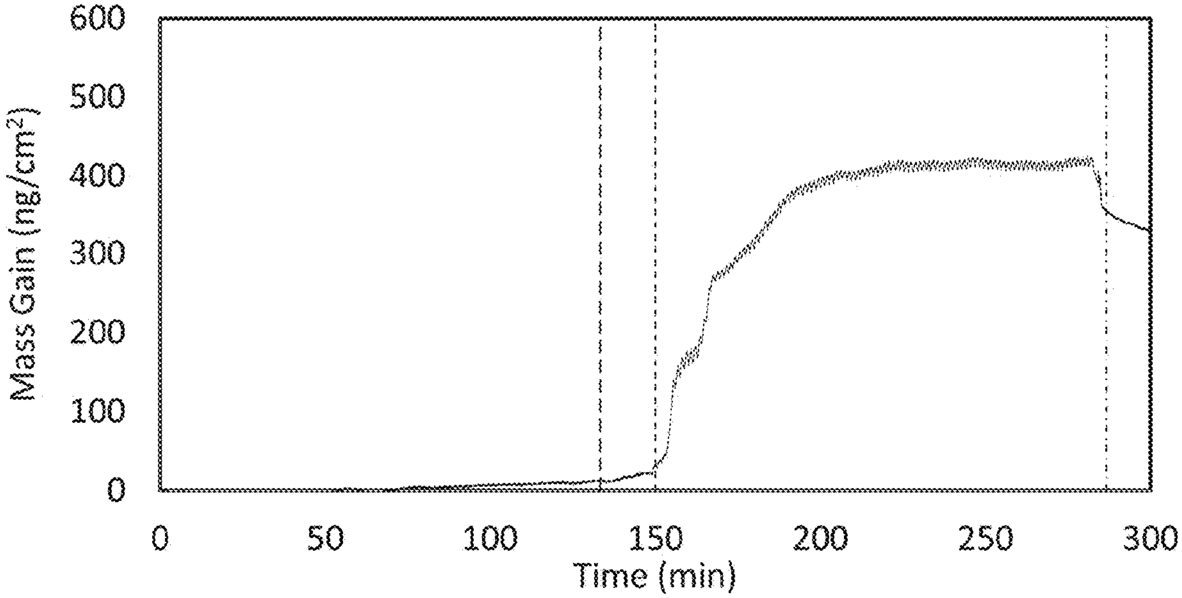
FIG. 1A shows a QCM plot of functionalizing Au surfaces with $1^{iPr}$.

As used herein, a "metal" is any of a class of substances characterized by high electrical and thermal conductivity as well as by malleability, ductility, and high reflectivity of light.

As used herein, the terms "physisorb" "physisorption" or "physical adsorption" mean adsorption in which the forces involved are intermolecular forces (e.g., van der Waals forces).

As used herein, the terms "chemisorb" or "chemical adsorption" mean adsorption in which the forces involved are valence forces of the same kind as those operating in the formation of chemical compounds.

As used herein, the term "dielectric material" means a substance that is a poor conductor of electricity, but an efficient supporter of electrostatic fields (i.e., insulator).

Organic ligands called N-heterocyclic carbenes (NHCs) have been investigated in AS-ALD processes described herein. NHCs have been shown to form strong bonds to many metal surfaces, including Au, Cu, Ag, Ru, W, Ni, Fe, Mo, Co, Pt and Pd, and alloys such as bronze and steel (see Crudden, C. M., et al., *Nature Chemistry* 2014, 6, 409, and Crudden, C. M., et al., U.S. Patent Application Publication No. 20160199875). These robust molecules protect metal surfaces and provide a solution to the challenges of electronic device manufacturing.

A metal surface refers to a metallic portion of a substrate, that is accessible to vapor deposition. The metallic portion may be the accessible layer of a bulk metal, or it may be a metallic coating that is located on a support. The support can be made of another substance such as a different metal than the metal of the metallic coating, or a non-metal such as silicon, indium tin oxide (ITO), alumina ($Al_2O_3$), glass, etc.

NHCs can be used as removable small molecule masks (i.e., films, coatings) and inhibitors to prevent deposition of other materials. As described herein, NHCs have been shown to bind selectively to metal surfaces in the presence of non-metal or metal oxide materials. Examples of metals include, but are not limited to Au, Cu, Ag, Ru, W, Ni, Fe, Mo, Co, Pt and Pd, and alloys such as bronze and steel. Examples of non-metal surfaces or metal oxide surfaces include $SiO_2$, $Si_3N_4$, $Al_2O_3$, $Si_wO_xN_y$ wherein w is 0 to 3, x is 0 to 2 and y is 0 to 4, $HfO_2$, or any combination thereof.

Among methods for device fabrication, organic molecules that chemisorb selectively to metal surfaces have led to the development of this method of small molecule inhibitors for selective area deposition. In this approach, the small molecule coating acts as protecting groups such that the metal is protected from reaction with unwanted entities. Examples of reactive entities that have been used to test the durability of the NHC coating, are trimethylaluminum (TMA), triethylaluminium (TEA) and diethylzinc (DEZ), which were used to deposit aluminum oxide or zinc oxide on metal after exposure to water as a co-reactant. In the absence of a protective surface film, these species and water react with metal to form a metal oxide coating. In selective area deposition, an organic surface species (i.e., surfactant) acts as an inhibition layer during dielectric deposition and growth. This technique is functionally simple, allows patterning over large areas, and can maintain the picometer scale resolution that atomic layer deposition (ALD) is known for.

A method of deposition is provided that includes placing a substrate, which had at least a metal surface, in a deposition chamber. The deposition chamber includes a valve-controlled inlet for carrier gas. The carrier gas had valve-controlled access to a bubbler that contained an NHC precursor (e.g., a salt of NHC). The salt of NHC has an anionic counterion that can be selected from the group consisting of bicarbonate, carbonate, alkylcarboxylate, arylcarboxylate, carboxylate, halide, triflate, pseudohalide (e.g., cyanide, azide), etc. Such salts form a stable precursor form of the NHC. In the examples herein, a description is provided of thermolysis of shelf stable benzimidazolium or imidazolium bicarbonate salts to generate a carboxylate adduct through a dehydration reaction, and then generation of a free carbene through a decarboxylation reaction (see Table 1 for structural formulae).

In some embodiments, the substrate was cleaned (e.g., by hot plasma) before deposition of the small molecule layer. If necessary, the temperature of the deposition chamber can be modified from a cleaning temperature to a selected deposition temperature. The bubbler containing the NHC precursor was then heated and maintained at a sufficiently high temperature to generate gaseous free carbene that collected in a headspace of the bubbler. At this point, intermittently and repeatedly, carrier gas, which included gaseous NHC, was pulsed into the deposition chamber (e.g., for about 60 seconds). After each pulse, the deposition chamber was purged with carrier gas (e.g., for about 20 seconds). Once approximately 100 pulses had been performed, the deposition chamber was allowed to cool to room temperature while being continuously purged with carrier gas. Purging the deposition chamber with carrier gas was performed to substantially remove physisorbed species. Using this method, NHC chemisorbed onto the metal surface in a self-saturating manner.

In a selective deposition process, a method of deposition is provided that includes disposing a patterned substrate in a deposition chamber, the patterned substrate has a metal surface, and a non-metal or metal oxide surface. The deposition chamber included a valve-controlled inlet for carrier gas. The carrier gas had valve-controlled access to a bubbler that contained an NHC precursor (e.g., a bicarbonate salt of NHC, alkylcarboxylate salt of NHC, an arylcarboxylate salt of NHC, or a carboxylate salt of NHC). In some embodiments, the substrate had been cleaned (e.g., by hot plasma) prior to exposure to NHC vapors. If necessary, the temperature of the deposition chamber can be modified from a cleaning temperature to a selected deposition temperature. The bubbler containing the NHC precursor was then heated and maintained at a sufficiently high temperature to generate gaseous free carbene that collected in a headspace of the bubbler. At this point, intermittently and repeatedly, carrier gas, which included gaseous NHC, was pulsed into the deposition chamber (e.g., for about 60 seconds). After each pulse, the deposition chamber was purged with carrier gas (e.g., for about 20 seconds). Once approximately 100 pulses had been performed, the deposition chamber was allowed to cool to room temperature while being continuously purged with carrier gas. Purging the deposition chamber with carrier gas was performed to remove physisorbed species. Using this method, NHC chemisorbed onto the metal surface in a self-saturating manner and substantially no NHC chemisorbed onto the non-metal or metal oxide surface.

Designing metallic patterns on integrated circuits could change the way semiconductors are manufactured. Such patterns would enable smaller features and better performance.

Traditional device fabrication techniques involve top-down strategies composed of multiple cycles of etching and lithographic steps. As device miniaturization progresses, the errors associated with top-down fabrication methods become problematic and new strategies are needed. Area-selective atomic layer deposition (AS-ALD) is a promising fabrication technique which relies on differences in local surface environment.

In one embodiment, a further step was performed of treating the substrate to refine the interface between the metal surfaces, and the non-metal or metal oxide surfaces. Examples of such treating include thermal annealing, and plasma treatment. See FIGS. 7B and 13A and 13B for more information about the effect of thermal annealing and refinement of the interfaces.

NHCs can be cleanly removed after use by thermal desorption to afford pristine metallic surfaces. Therefore, NHCs are ideal candidates for passivating patterned substrates in AS-ALD.

As described herein, exemplary NHCs, 1,3-diisopropylbenzimidazolylidene ($1^{iPr}$) and 1,3-ditertbutyllbenzimidazolylidenes ($2^{tBu}$), were deposited on Ag, Cu, Co, W, Fe, Mo and Ru in an ALD Tool (see the Working Examples). Film quality of the resultant film was assessed by X-ray photoelectron spectroscopy (XPS) and time-of-flight secondary-ion mass spectrometry (ToF-SIMS) experiments. Further studies on patterned substrates found that it was possible to deposit NHCs on metal surfaces selectively, in the presence of non-metal, metal oxide, or dielectric surfaces. Specifically, $1^{iPr}$ and $2^{tBu}$ were successfully selectively deposited on the metal areas of patterned substrates bearing side-by-side areas of exemplary metals (e.g, Cu, Ru, or Co), and exemplary dielectric (e.g., $SiO_2$ or $Al_2O_3$) surfaces. Successful deposition of $1^{iPr}$ and $2^{tBu}$ was determined by XPS and ToF-SIMS analyses. The patterned substrates had alternating lines of metal surface (Cu, Co or Ru) and dielectric surface. Separate substrates were used for each of these three metals. This method of selective deposition of patterned substrates is described herein.

A series of experiments utilizing a tube furnace reactor equipped with a quartz crystal microbalance (QCM) was performed to help probe the optimal conditions for various NHCs to be deposited, using crystals coated with optically-polished Au films as a standard (see FIGS. 1-3). The QCM study detected areal mass changes on the order of ng/cm$^2$, so it was used to analyze sub-saturative growth behavior and reliably demonstrate surface saturation (International Technology Roadmap for Semiconductors: https://irds.ieee.org/editions/2018).

Parameters, such as the pulse time for introducing the NHC and the "soak" time to help ensure full coverage were optimized. However, these experiments, while useful in determining essential parameters in tandem with XPS, were often qualitative in their determination of full surface coverage. Analysis by ToF-SIMS was used to optimize the deposition parameters.

Figure 1B:
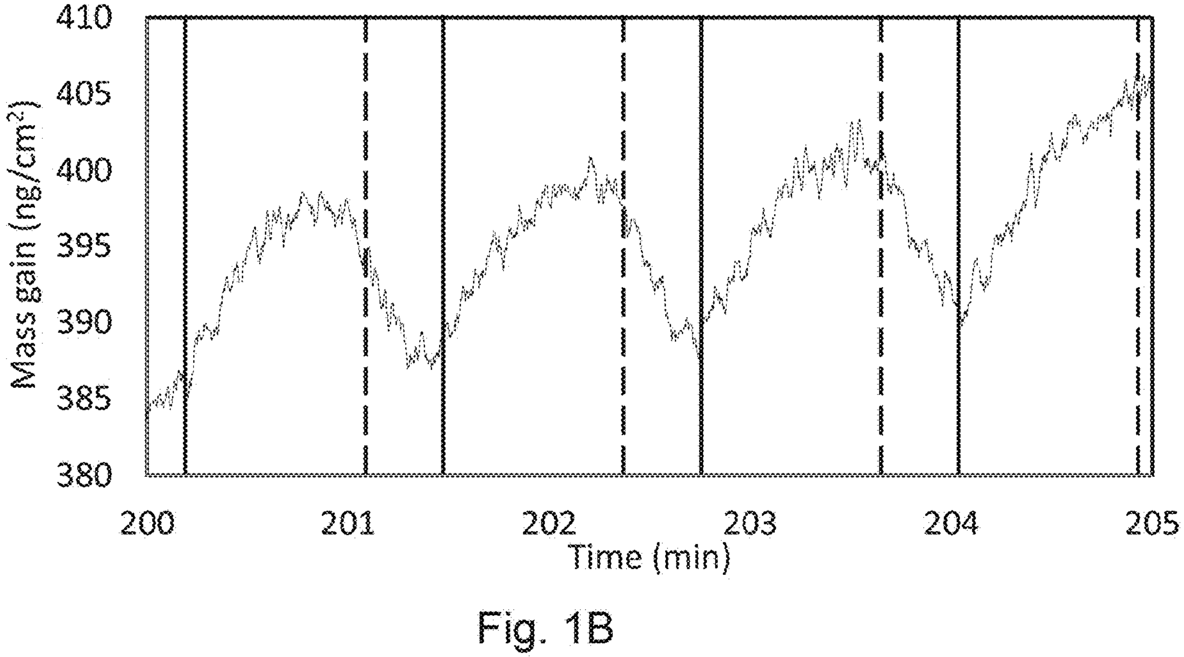
FIG. 1B shows a close-up plot of saturation point.

Referring to FIGS. 1A and 1B, deposition is graphically shown for $1^{iPr}$ on polycrystalline Au surfaces. These saturation experiments were carried out by exposing a low temperature (40° C.) surface to 100 pulses of precursor (60 s pulses, 20 s purges, 50 sccm flow). With a low bubbler temperature (40° C.) no deposition was observed, but when the bubbler was heated to 70° C., the gold surface was saturated with $1^{iPr}$. During the first 10 cycles, a plateau was observed at 170 ng/cm$^2$ (corresponding to approximately 5.0 NHCs/nm$^2$) followed by eventual saturation of the surface of approximately 410 ng/cm$^2$ (12 NHCs/nm$^2$) after 40-50 cycles. The initial plateau corresponded to an areal NHC density that was comparable to that seen in a $2^{tBu}$ saturation experiment (see FIGS. 2A-2B) and is consistent with previous electrochemical measurements of surface density (Crudden, C. M., et al., *Nature Chemistry* 2014, 6, 409). The saturation delay may be due to a transition from a lower density packing formation to a higher density packing formation or supersaturation. Following this saturation experiment, a rapid mass loss event was observed, indicating a loss of loosely bound NHC on the surface. A high level of density, and a rapid mass loss at the end of the deposition experiment likely indicated supersaturation of the surface. As seen in FIGS. 1A-1B, a mass change is shown during pulse and soak cycles at 100 minutes. The sawtooth like pattern shows a small decrease of mass, but then returned to the saturation point on pulse. This demonstrates the full surface saturation, and the small change in mass was likely uncoordinated NHC precursor being volatilized in the purge events.

Figure 2A:
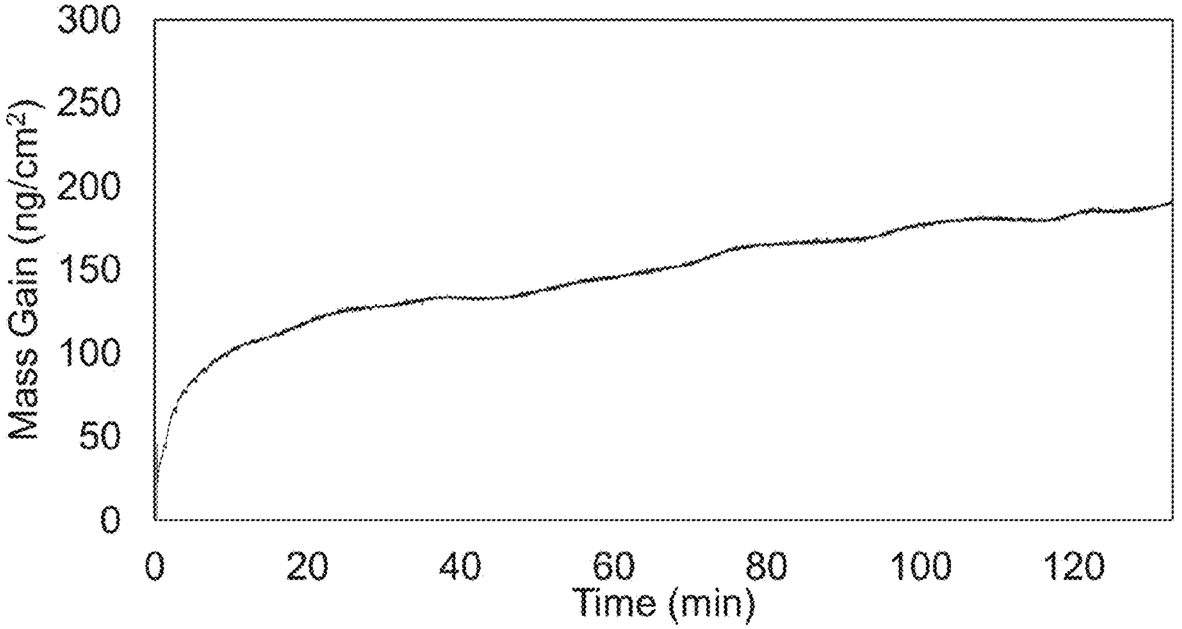
FIG. 2A shows a QCM plot of functionalizing Au surfaces with $2^{tBu}$.
Figure 2B:
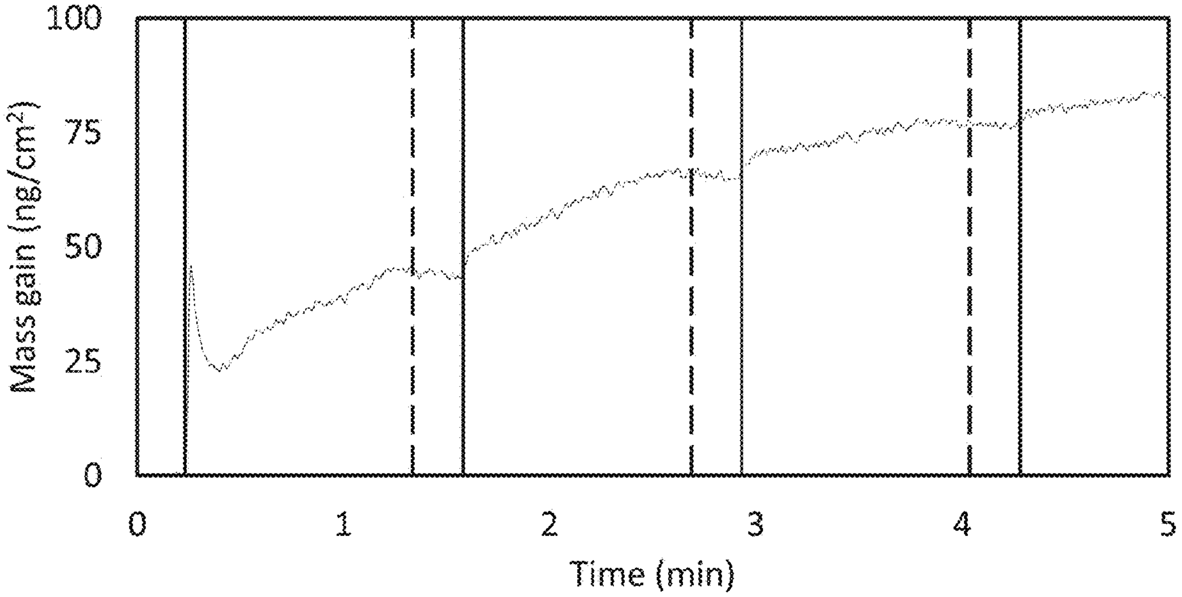
FIG. 2B shows a close-up window of ramping pulses.

Referring to FIGS. 2A and 2B, deposition QCM plots of $2^{tBu}$ is shown. This experiment utilized the same pulse conditions shown in the plots of FIGS. 1A-1B, but was conducted with a reactor and bubbler temperature of 100° C. to compensate for lower volatility of $2^{tBu}$. Saturative growth behaviour was observed during the first 20 cycles, and plateaued at a value of 130 ng/cm$^2$ (3.4 NHC/nm$^2$). Then the growth behaviour transitioned into linear growth until the end of deposition, reaching a value of 190 ng/cm$^2$ (5.0 NHCs/nm$^2$). The lower packing density and slower rate of surface functionalization were likely due to steric differences between tBu alkyl groups compared to iPr. It was shown by STM that steric crowding afforded by the addition of tBu groups can result in less tightly packed monolayers, which results in less ligands required to fully saturate a surface of a substrate (A. Inayeh, 2021, *Nature Communications,* 12, 1-9). FIG. 2B shows a mass change during first few pulses on a pristine QCM surface. Overall, mass gain is seen during pulse steps, and no mass change during purges. During the first pulse, a spike was observed due to the release of pressure build up in the bubbler headspace. Mass gain per cycle decreased rapidly after the first three pulses. This decrease indicated saturative growth behaviour.

Deposition properties were analyzed by changing the wingtips to ethyl groups, resulting in 1,3-diethylbenzimidazolylidene ($3^{Et}$). It was previously shown that NHC ligands with ligands bearing primary wing groups tend to lie flat on surfaces (C. R. Larrea, *Chem Phys Chem.,* 2017, 18, 3536-3539). This is in contrast to NHCs having secondary or tertiary wingtip groups such as $1^{iPr}$ and $2^{tB}$ which have been shown to stand in upright positions on surfaces (C. R. Larrea, *Chem Phys Chem.,* 2017, 18, 3536-3539). This upright coverage has use in specific surface applications, including selective area deposition as described here, and in all kinds of device manufacturing and sensing (I. Singh, et al., 2021, Chem. Comm. 57, 8421-8424).

Figure 3A:
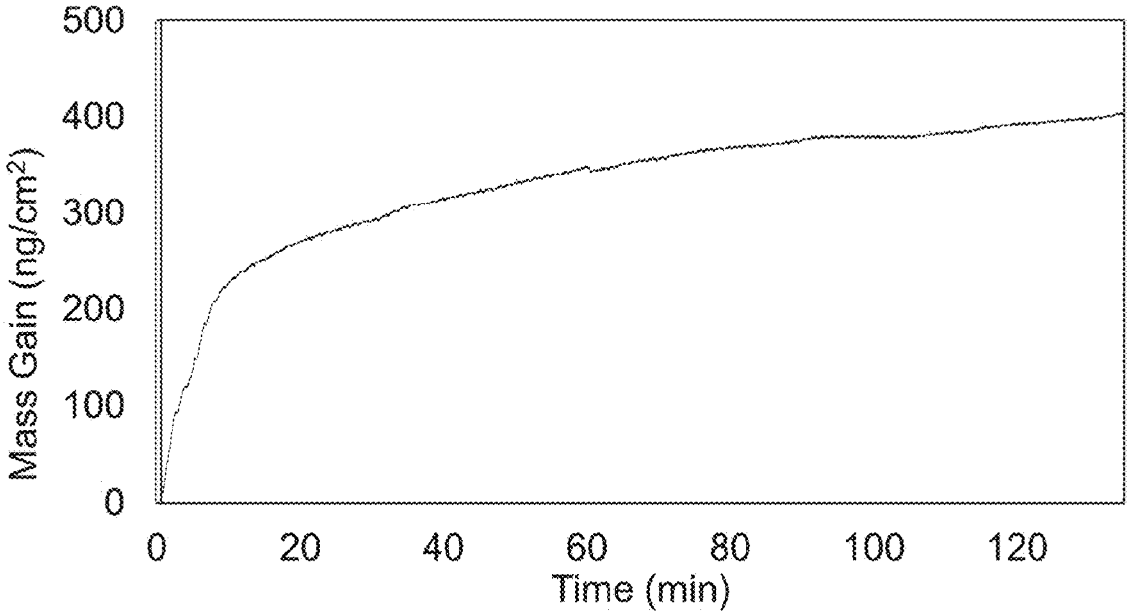
FIG. 3A shows a QCM plot of functionalizing Au surfaces with $3^{Et}$.
Figure 3B:
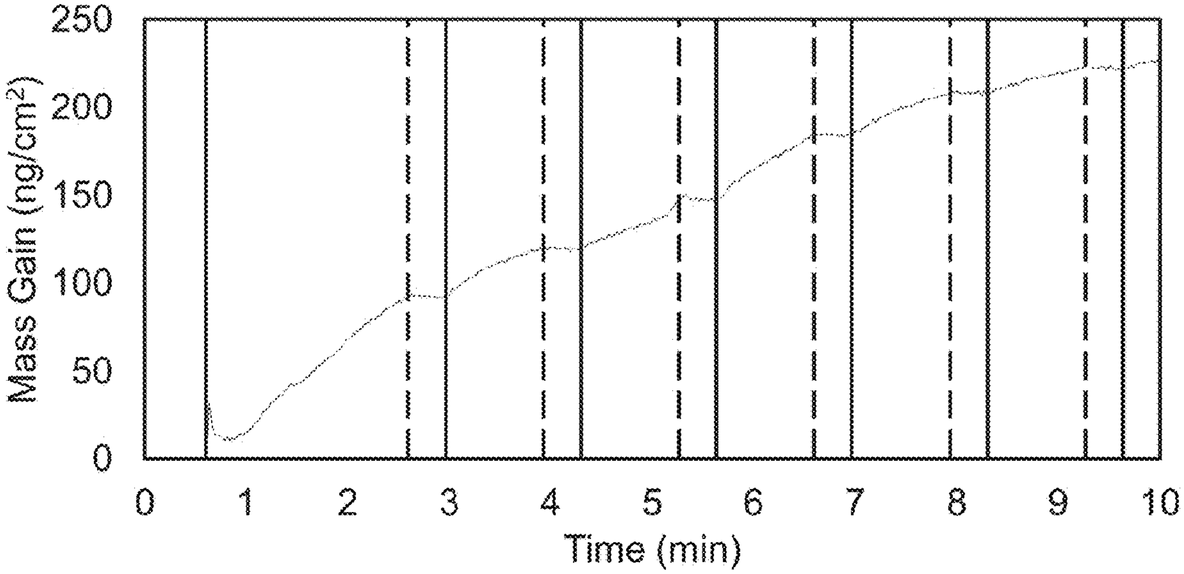
FIG. 3B shows a close-up of ramping pulses.

Referring to FIGS. 3A and 3B, QCM plots of functionalizing Au surfaces with $3^{Et}$. The plot of FIG. 3A demonstrates a similarly quick ramp in mass change, consistent with $1^{iPr}$. The saturation point was considerably higher than $2^{tBu}$, at 400 ng/cm$^2$ (14 NHC/nm$^2$). This level of areal NHC density exceeds those seen in the super-saturative levels in the $1^{iPr}$ experiment. Following the deposition, a slight mass increase is observed. This may be due to the system equilibrating to the change in pressure the system experiences post deposition. FIG. 3B shows the mass change during first few pulses on a fresh QCM surface. Overall, mass gain was seen during the pulse steps, and no mass change during purges. At the beginning of the experiment, due to a valve malfunction, the first purge step is missed resulting in a longer than expected first pulse. During this pulse a spike is observed, again due to the release of pressure build up in the bubbler headspace. Following the first pulse, mass gain per cycle slowly decreases as the surface approaches saturation.

For both $1^{iPr}$ and $2^{tBu}$, plateaus or changed in growth behaviour were observed partway through their saturation experiments. Changes in growth behaviour may be responsible due to changes in NHC packing structure as the surface became more populated by surfactants.

Figure 4:
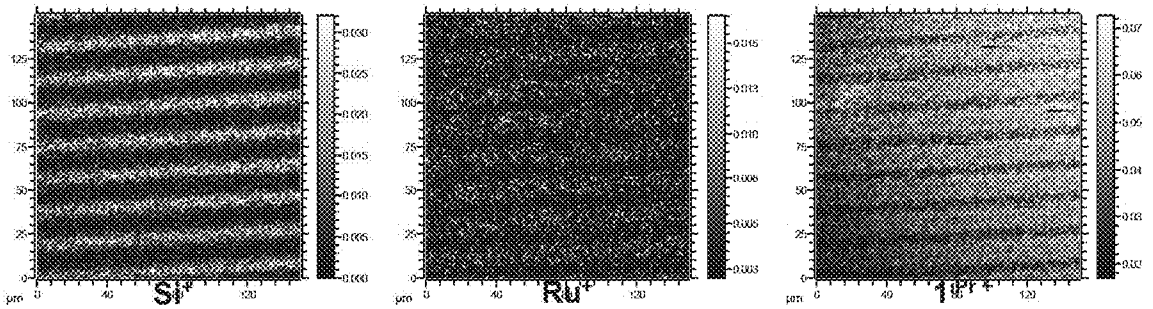
FIG. 4 shows ToF-SIMS imaging of $1^{iPr}$ on a patterned Ru and $SiO_2$ substrate, wherein from left to right, secondary ions are $Si^+$, $Ru^+$ and molecular ion $1^{iPr+}$ normalized to total ion yield.
Figure 5:
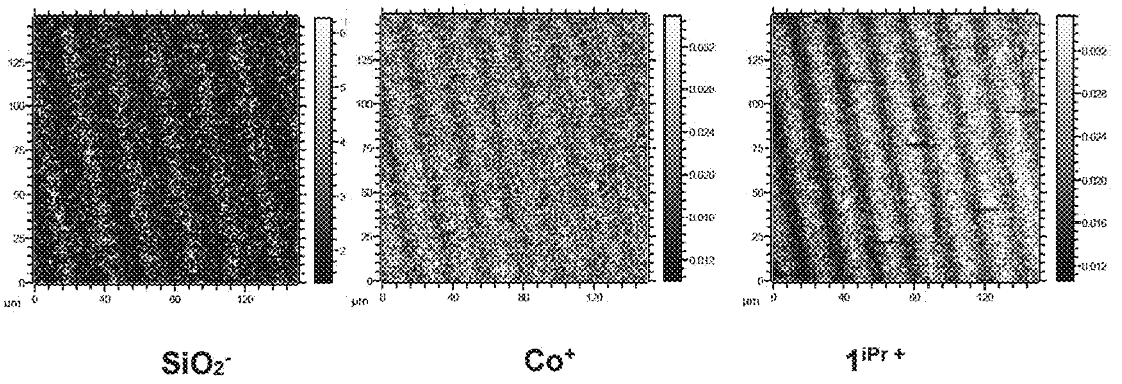
FIG. 5 shows ToF-SIMS imaging of $1^{iPr}$ on a patterned Co and $SiO_2$ substrate, wherein from left to right, secondary ions are $SiO_2^-$, $Co^+$, and molecular ion $1^{iPr+}$ normalized to total ion yield.
Figure 6:
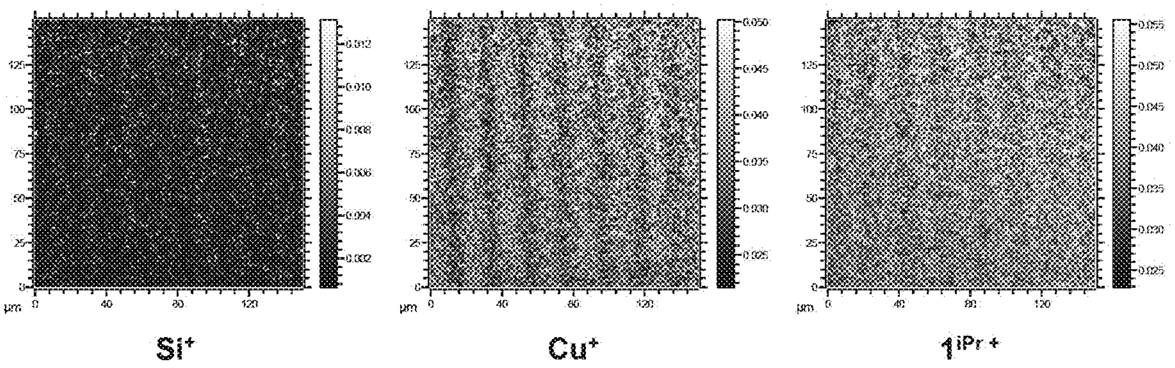
FIG. 6 shows ToF-SIMS imaging of $1^{iPr}$ on a patterned Cu and $SiO_2$ substrate, wherein from left to right, secondary ions are $Si^+$, $Cu^+$ and molecular ion $1^{iPr+}$ normalized to total ion yield.
Figure 14:
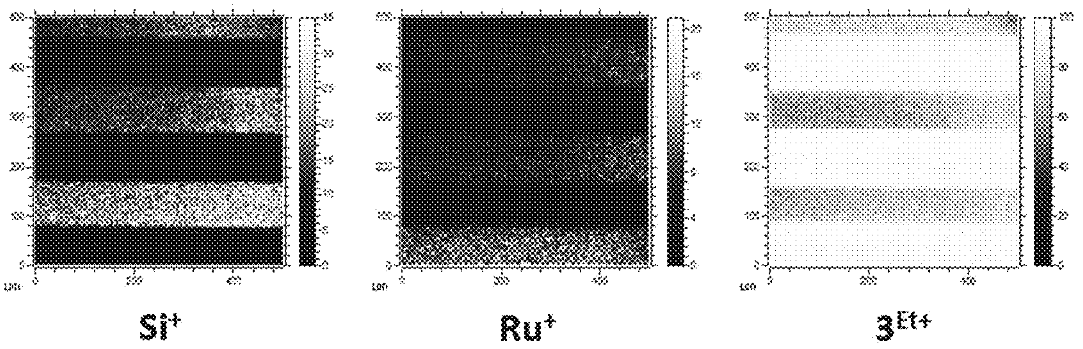
FIG. 14 shows ToF-SIMS imaging of $3^{Et}$ on a patterned Ru and $SiO_2$ substrate, wherein from left to right, secondary ions are $Si^+$, $Ru^+$, and molecular ion $3^{Et+}$ normalized to total ion yield.
Figure 15:
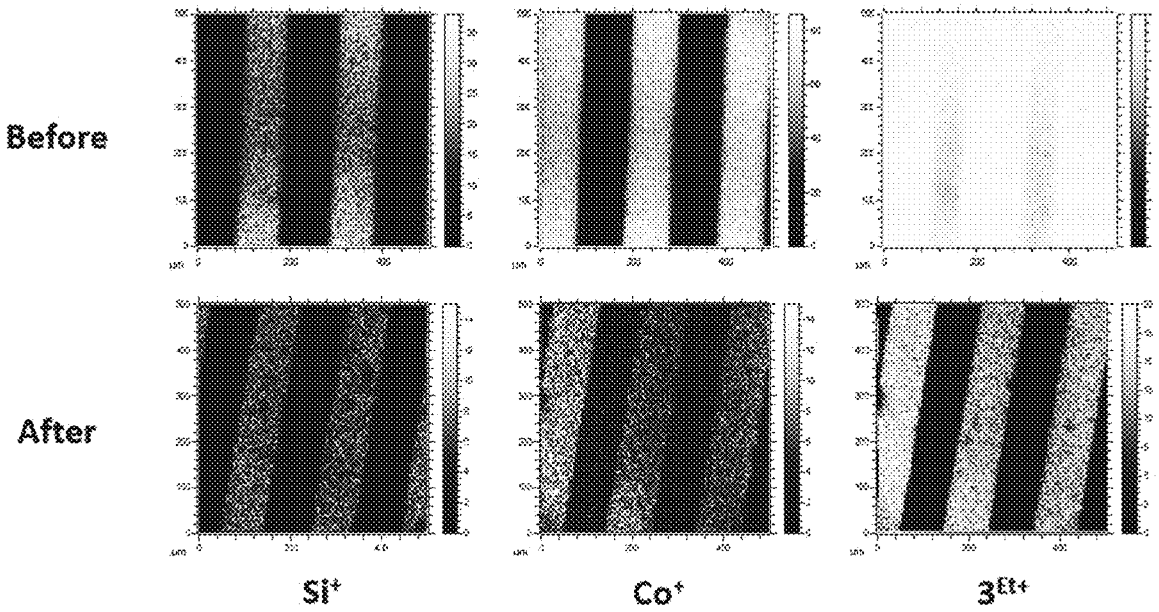
FIG. 15 shows ToF-SIMS imaging of before and after vacuum annealing for $3^{Et}$ on a patterned substrate of Co and $SiO_2$, wherein from left to right, the secondary ions are $Si^+$, $Co^+$, and molecular ion $3^{Et+}$ normalized to the total ion yield.

To understand selective deposition of the NHCs on patterned metal surfaces, ToF-SIMS imaging was employed. ToF-SIMS provides mass spectrometry. Masses can be correlated to species within the system. After functionalizing patterned substrates with NHCs, surfaces were imaged by probing for different possible ions that could be observed. These images show ejected $Si^+$ from areas that were expected to be composed of $SiO_2$, and M+ ions in samples (Co, Cu, or Ru) in metal areas. Referring to FIG. 4, a ToF-SIMS image is shown for $1^{iPr}$ on a mixed $SiO_2$/Ru sample, prepared with alternating metal and silicon oxide layers. Referring to FIG. 5, a ToF-SIMS image is shown for $1^{iPr}$ on a mixed $SiO_2$/Co sample, prepared with alternating metal and silicon oxide layers. Referring to FIG. 6, a ToF-SIMS image is shown for $1^{iPr}$ on a mixed $SiO_2$/Cu sample, prepared with alternating metal and silicon oxide layers. Referring to FIG. 14, a ToF-SIMS image is shown for $3^{Et}$ on a patterned Ru/$SiO_2$ substrate, prepared with alternating metal and silicon oxide layers. From left to right, as indicated by light bands, location of secondary ions $Si^+$, $Ru^+$, and molecular ion $3^{Et+}$ are shown. Referring to FIG. 15, a ToF-SIMS image is shown before and after vacuum annealing for $3^{Et}$ on a patterned Co/$SiO_2$ substrate. From left to right, as indicated by light bands, secondary ions $Si^+$, $Co^+$, and molecular ion $3^{Et+}$ are shown.

The ToF-SIMS data confirmed that substrate patterning was obtained and that the NHC preferentially chemisorbed to the Ru, Co and Cu metal surfaces in the presence of the silicon oxide dielectric layer, and substantially no NHC was present on the dielectric surface of each sample.

Evidence of NHC deposition on metallic regions was provided by the presence of the molecular ion of the NHC ligand on the ToF-SIMS images shown by the far-right of FIGS. 4-6. Ru and Co samples showed that the NHC appeared localized with the metal.

With Cu, the NHC was more distributed, which may be related to the pre-cleaning process since the Cu to Si distribution was less well defined, suggesting migration of the metal to Si during cleaning.

Figure 7A:
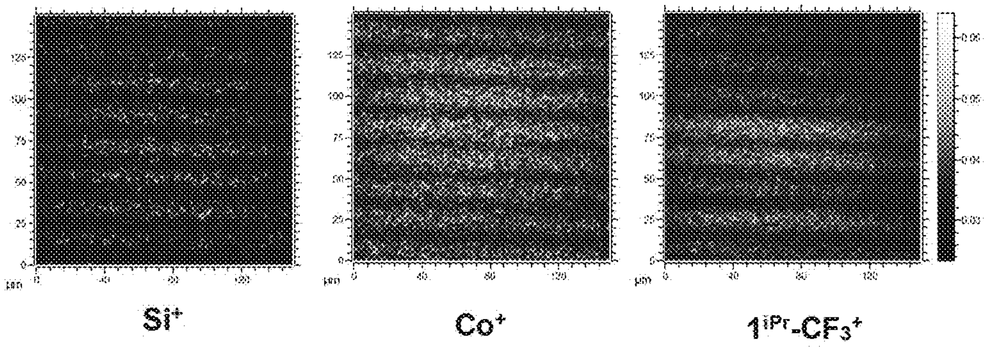
FIG. 7A shows ToF-SIMS imaging of $1^{iPr}$-$CF_3$ on a patterned Co and $SiO_2$ substrate, wherein from left to right, secondary ions are $Si^+$, $Co^+$, and molecular ion $1^{iPr}$-$CF_3^+$ normalized to total ion yield.

To enhance visualization of where the NHC was deposited, a synthesis was developed of a modified NHC, which was readily detectable by XPS. Namely, $1^{iPr}$-$CF_3$ was synthesized, wherein a $CF_3$ group is located on the aromatic backbone of the NHC. Referring to FIG. 7A, ToF-SIMS imaging is shown of $1^{iPr}$-$CF_3$ on a patterned Co and $SiO_2$ substrate, wherein from left to right, secondary ions are $Si^+$, $Co^+$, and molecular ion $1^{iPr}\cdot CF_3{}^+$, normalized to total ion yield. Co patterned surfaces functionalized with $1^{iPr}$-$CF_3$showed clear area selectivity when detecting the molecular ion $1^{iPr}\cdot CF_3{}^+$. This result definitively showed selective metal functionalization of NHC. This result corroborated XPS experiments on single compound surfaces, which also confirmed surface binding for this NHC ligand.

Figure 7B:
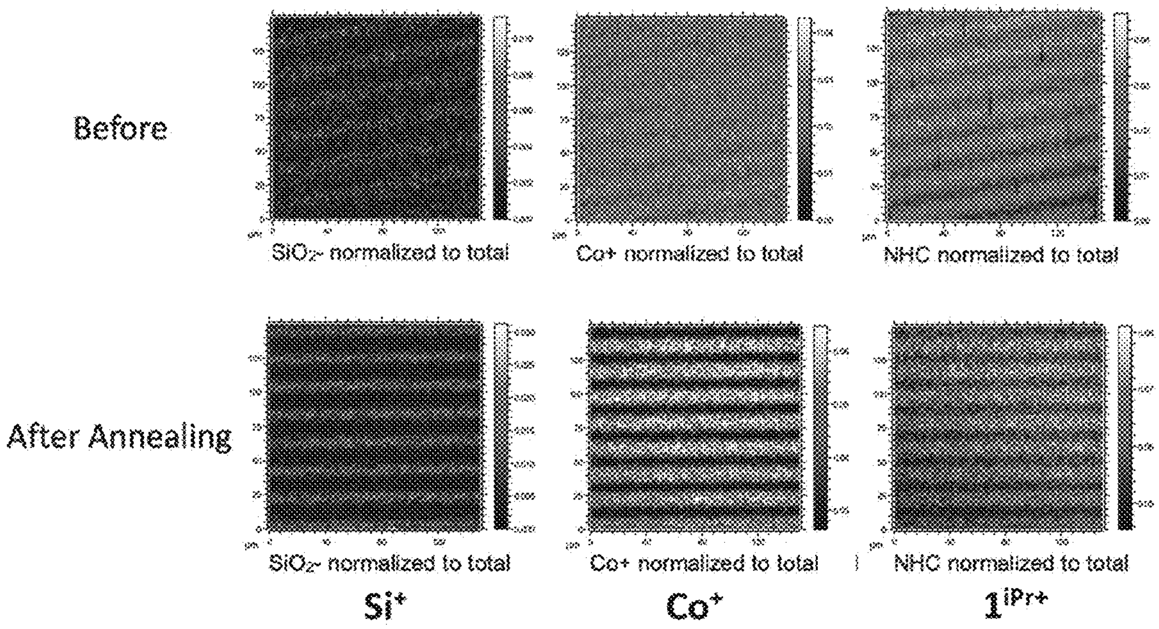
FIG. 7B shows ToF-SIMS images of before and after vacuum annealing for $1^{iPr}$ on a patterned substrate of Co and $SiO_2$, wherein from left to right, the secondary ions are $Si^+$, $Co^+$ and molecular ion $1^{iPr+}$ normalized to total ion yield.

To further examine the effect of the NHC on patterned surfaces, a mixed $SiO_2$/Co sample was prepared, exposed to NHC as described herein, and then was annealed at 170° C. for 12 hours. As shown in FIG. 7B, the anneal process did not affect the NHC on the metal surface, but it did have the effect of dramatically improving delineation between the metal and the silicon dioxide sections. This result suggests that NHC facilitates removal of metal that has migrated to the silicon dioxide.

Figure 8A:
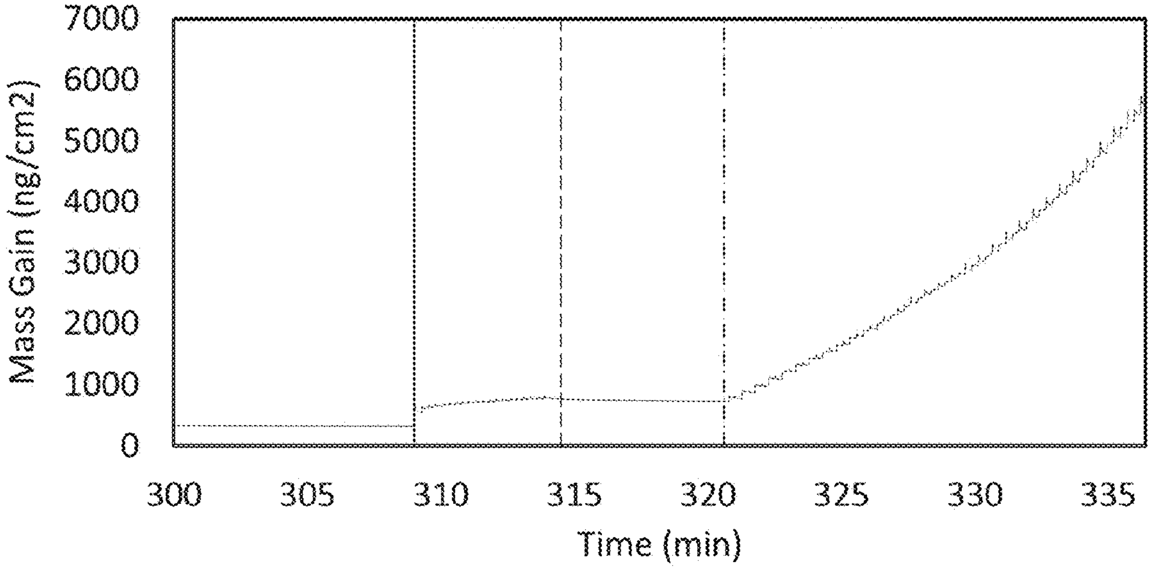
FIG. 8A shows a QCM plot of study of Au patterned surfaces functionalized with $1^{iPr}$ to resist interaction with TMA and $H_2O$ pulses.
Figure 8B:
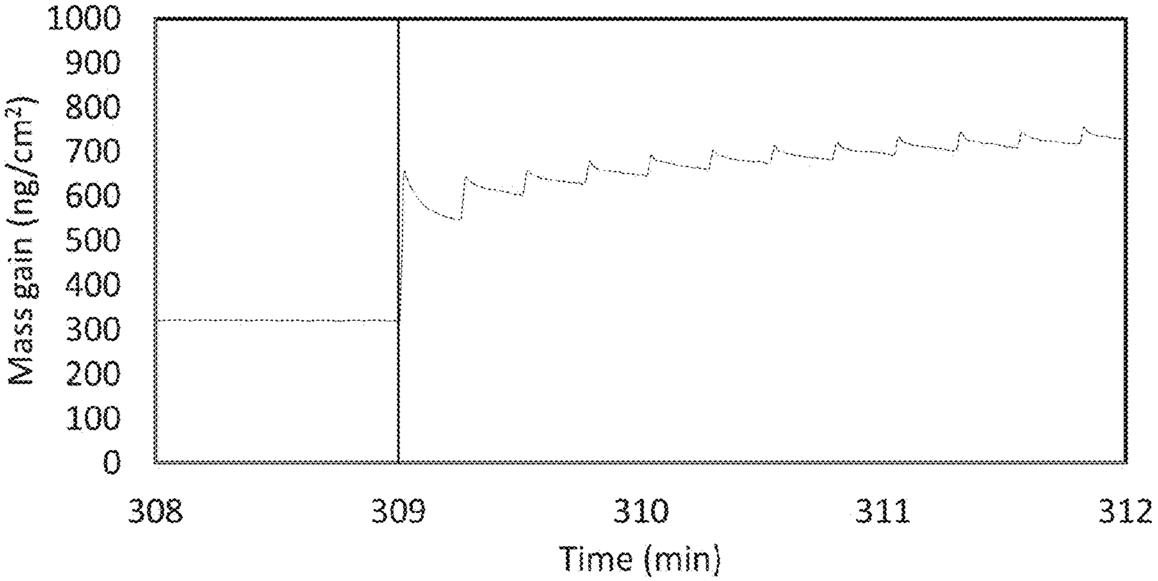
FIG. 8B is a close up of FIG. 8A, and also shows a QCM plot of study of Au patterned surfaces functionalized with $1^{iPr}$ to resist interaction with TMA and $H_2O$ pulses.
Figure 9A:
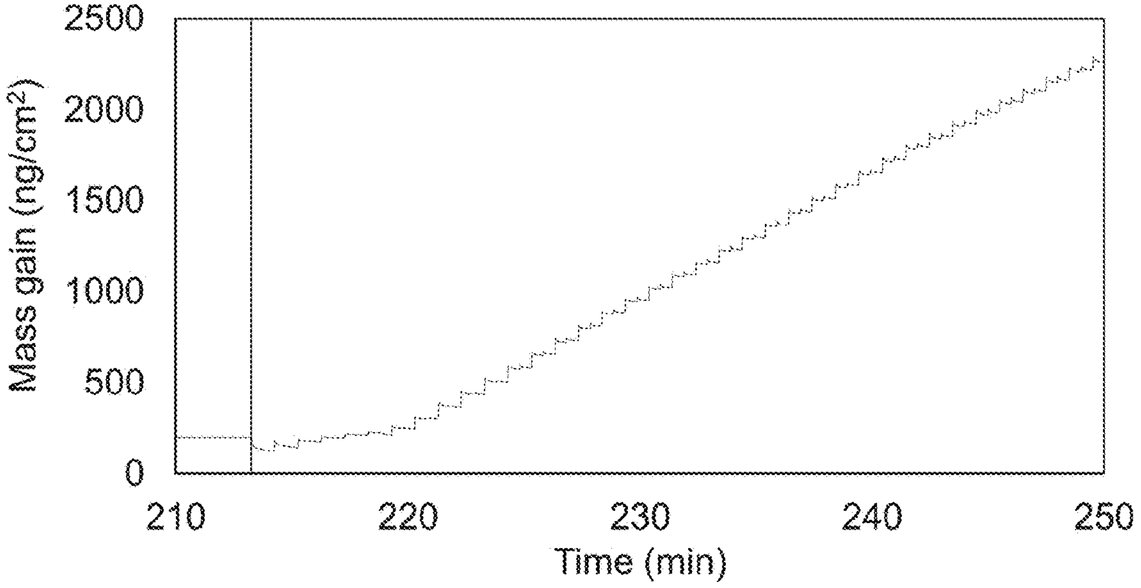
FIG. 9A shows a QCM plot of study of Au patterned surfaces functionalized with $2^{tBu}$ to resist interaction with TMA and $H_2O$ pulses.
Figure 9B:
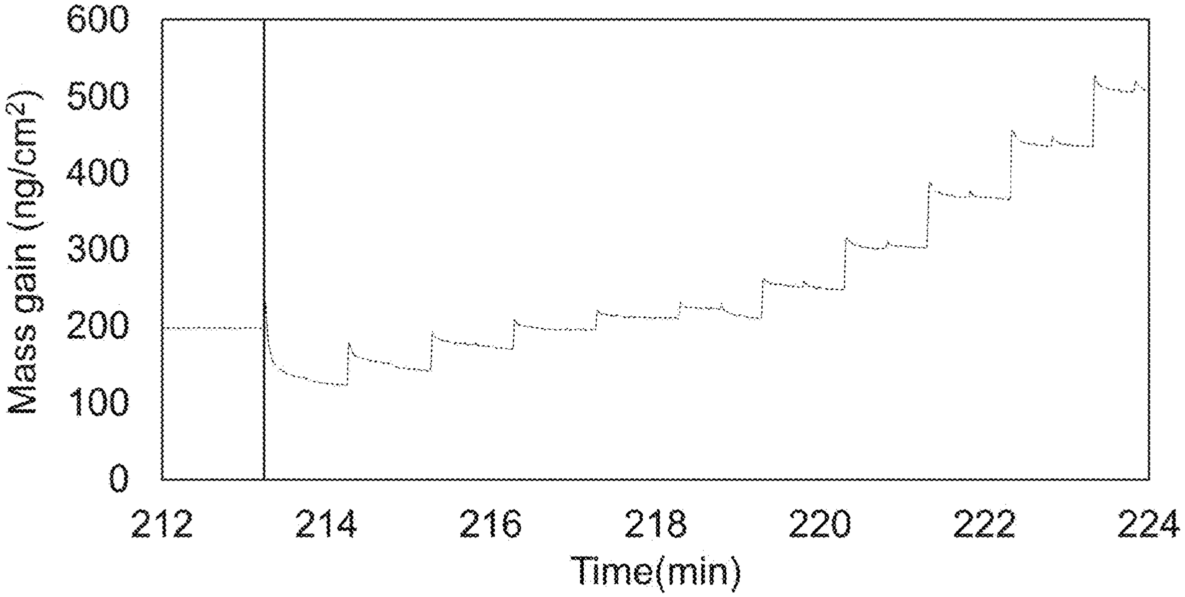
FIG. 9B is a close up of FIG. 9A and also shows a QCM plot of study of Au patterned surfaces functionalized with $2^{tBu}$ to resist interaction with TMA and $H_2O$ pulses.
Figure 10A:
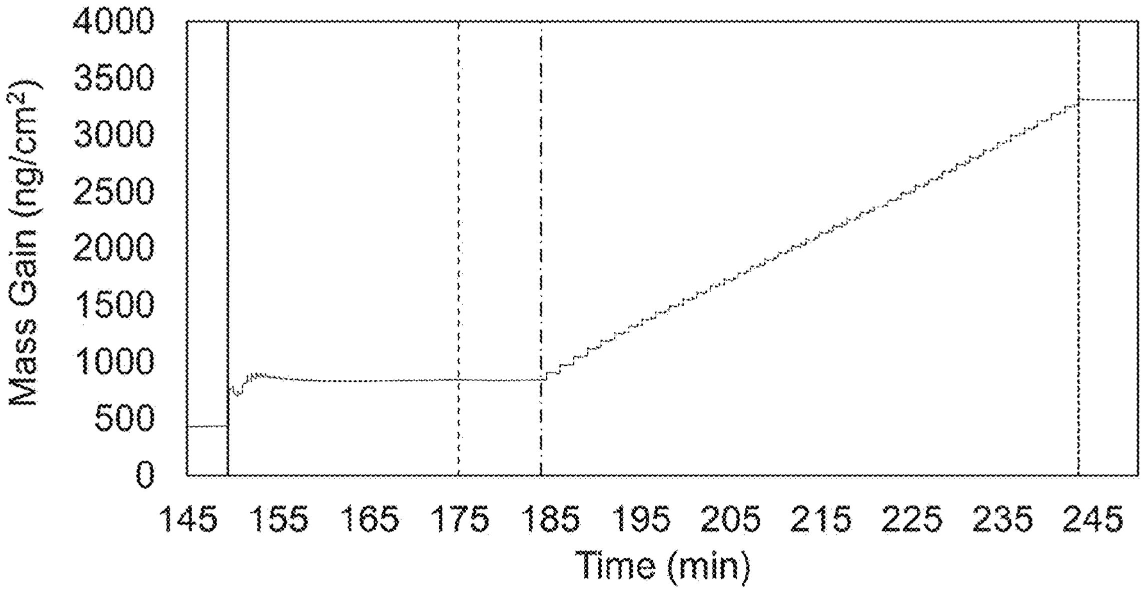
FIG. 10A shows a QCM plot of Au patterned surfaces functionalized with $3^{Et}$ to resist interaction with TMA and $H_2O$ pulses.
Figure 10B:
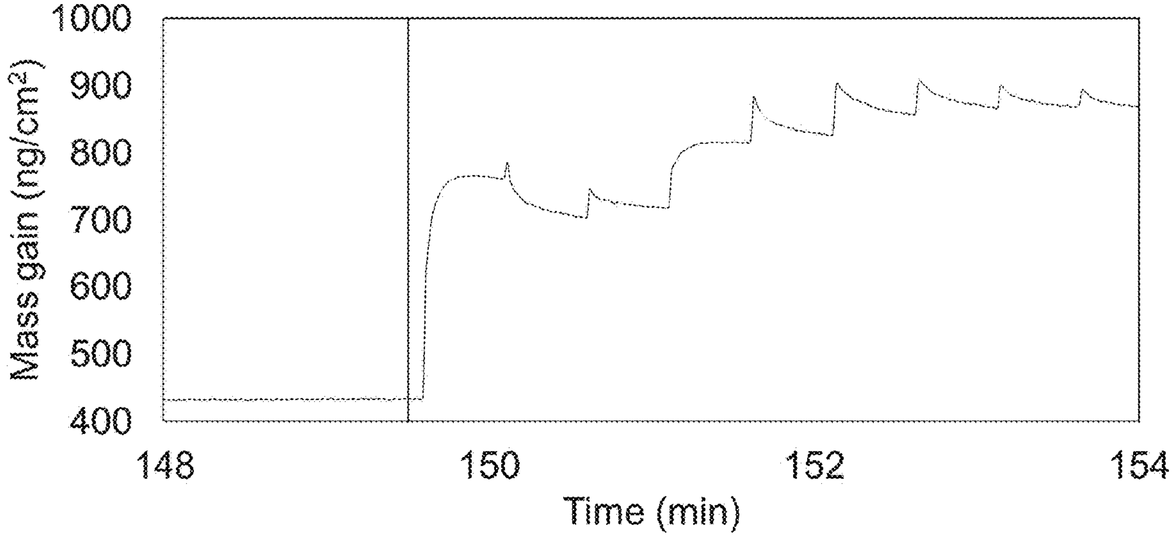
FIG. 10B is a close up of FIG. 10A, and also shows a QCM plot of Au patterned surfaces functionalized with $3^{Et}$ to resist interaction with TMA and $H_2O$ pulses.

Referring to FIGS. 8A-10B, an addition of TMA followed by addition of water, is a known approach to form alumina ($Al_2O_3$) interfaces in semiconductor manufacturing. Gold coated QCM crystals functionalized with $1^{iPr}$ (see FIG. 8), $2^{tBu}$ (see FIG. 9) and $3^{Et}$ (see FIG. 10) were subjected to a series of TMA micro pulses followed by an industry standard TMA/$H_2O$ deposition (S. M. George, 2010, *Chem. Rev.* 110(1): 111-131). In the case of $1^{iPr}$, after full functionalization of the surfaces, which was followed by QCM, the surface was subjected to 0.1 s micropulses of TMA for 5 minutes to examine the initial effect of strong acid TMA on the carbene monolayer (FIGS. 8A-8B). Following this, alternating 0.1 s pulses of TMA followed by $H_2O$ were utilized and the mass gain measured. During a TMA durability experiment (exposure without water as a second precursor), saturative deposition on the surface was observed, followed by linear growth behaviour during TMA/$H_2O$ deposition. Although this indicates that TMA eventually adhered to the $1^{iPr}$ coating, the presence of a time lag before full coverage in this experiment suggests that the surface-bonded NHC was retained and that preferential growth on an oxide surface is feasible under optimized conditions to lengthen the window before oxide growth begins.

In the case of $2^{tBu}$ (FIGS. 9A-9B), after full functionalization, a small degree of mass loss was observed during the TMA durability studies, followed by a linear growth behaviour during the TMA/$H_2O$ deposition. The initial mass loss indicated some degradation of the $2^{tBu}$ coating, which was expected based on its greater steric bulk and lower thermal robustness of the $2^{tBu}$ coating (A. Inayeh, et al., 2021, *Nature Comm.*, 12, 1-9).

In the case of the $3^{Et}$ TMA durability test (FIGS. 10A-10B), a large degree of mass gain was observed initially, followed by inconsistent mass gain up until the surface is saturated, followed by a linear growth behaviour during the TMA/$H_2O$ deposition. The inconsistent mass gain following the first pulse indicates some degradation of the $3^{Et}$ coating, partially inhibiting the growth of TMA on the surface. This is also consistent with the lower stability of these films.

Figure 11A:
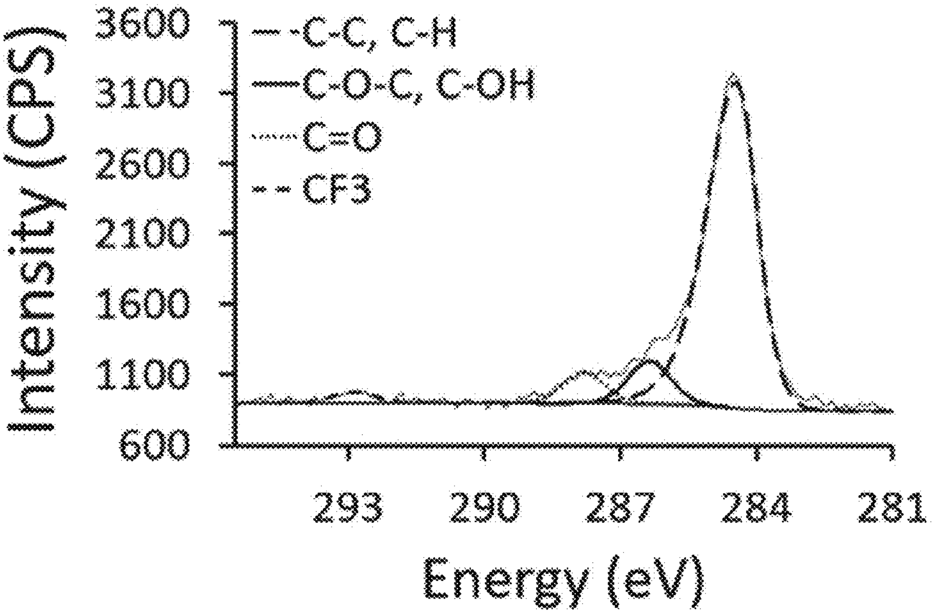
FIG. 11A shows a representative XPS Spectra for C of $1^{iPr}$·$CF_3$ bound to Co surfaces, as a plot of counts per second (CPS) vs. Energy (eV).
Figure 11B:
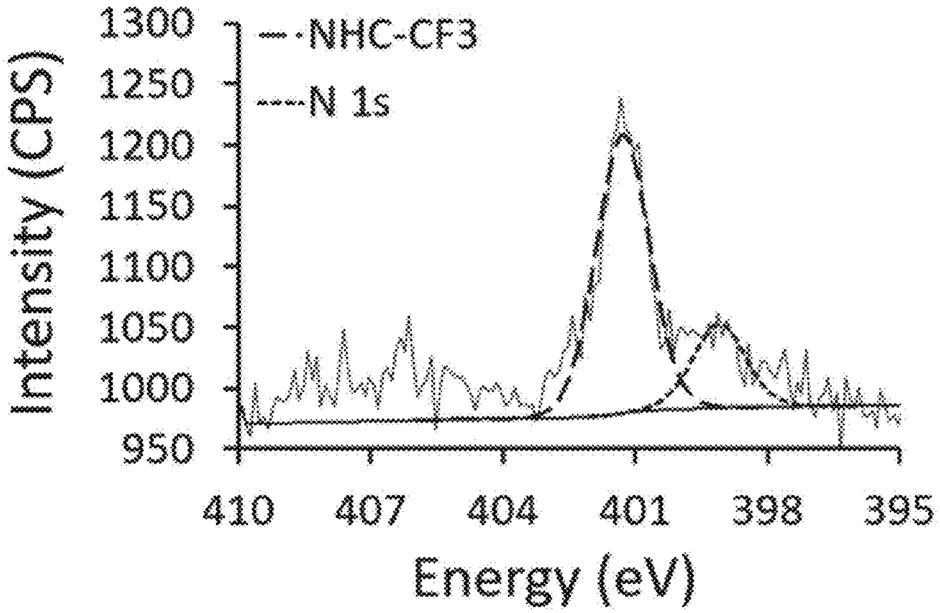
FIG. 11B shows representative XPS Spectra for N of $1^{iPr}$·$CF_3$ bound to Co surfaces, as a plot of counts per second (CPS) vs. Energy (eV).
Figure 11C:
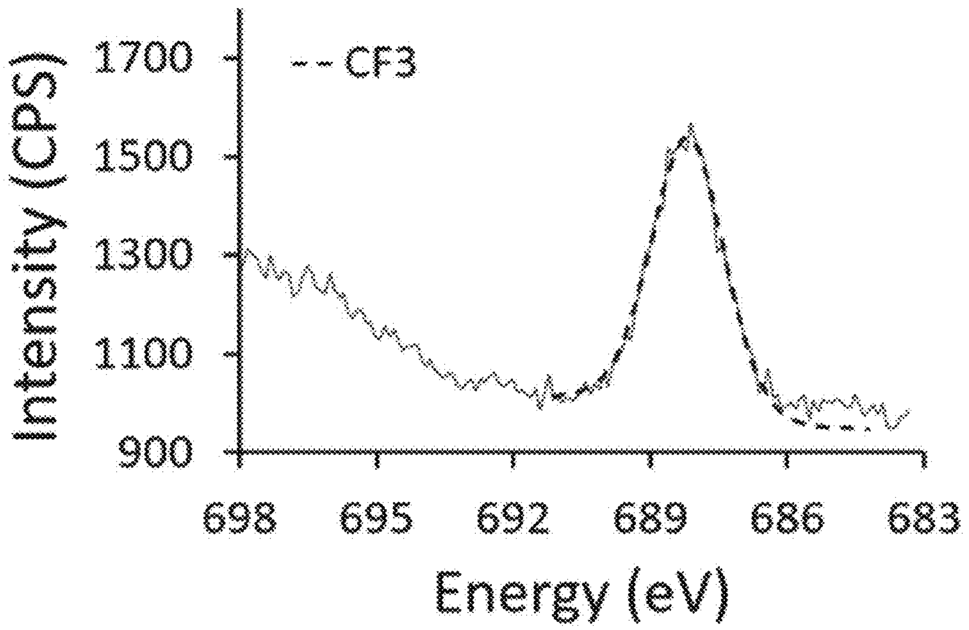
FIG. 11C shows representative XPS Spectra for F of $1^{iPr}$·$CF_3$ bound to Co surfaces, as a plot of counts per second (CPS) vs. Energy (eV).

Referring to FIGS. 11A-11C, representative XPS Spectra for C, N, and F are shown of $1^{iPr}\cdot CF_3$ bound to Co surfaces, as plots of counts per second (CPS) vs. Energy (eV).

Figure 12:
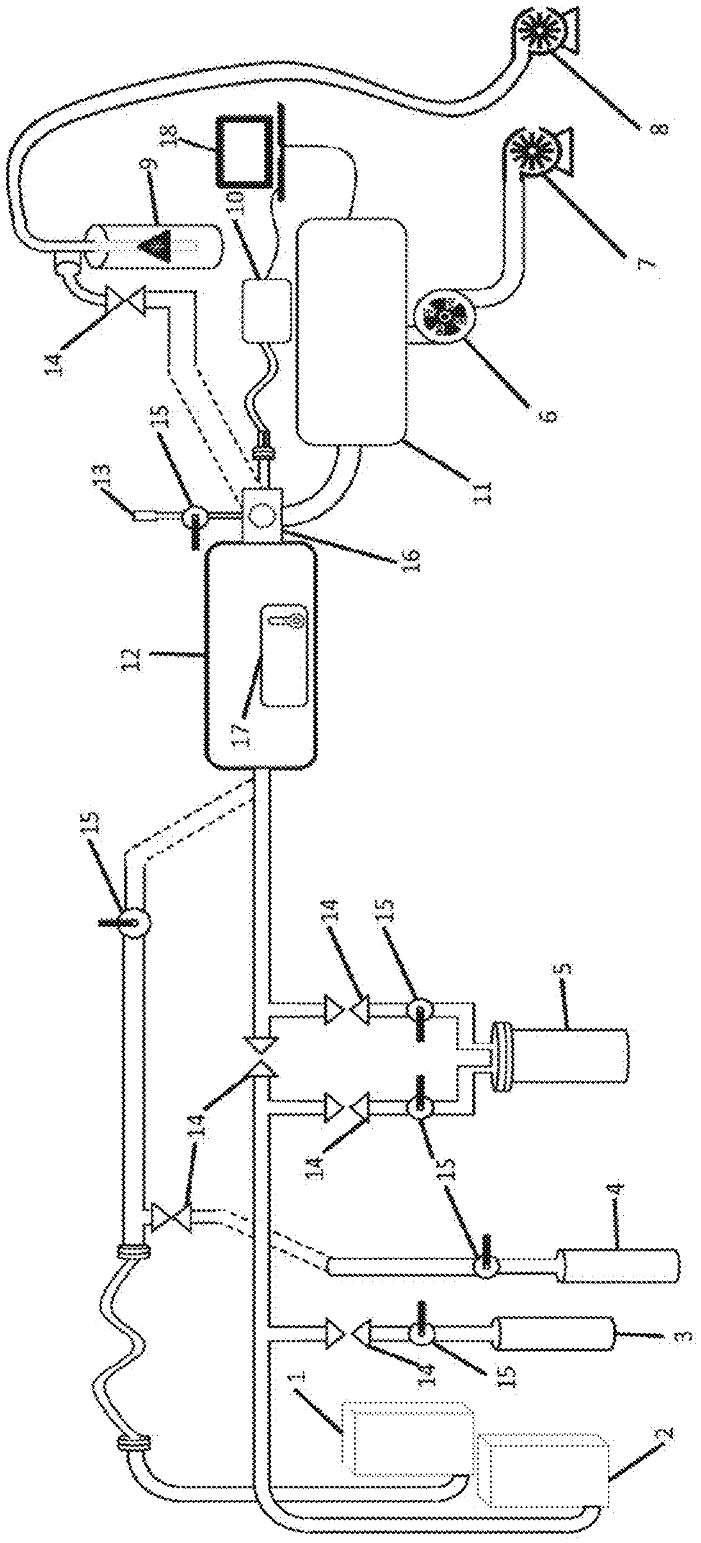
FIG. 12 shows a schematic of a custom built atomic layer deposition (ALD) tool.

Referring to FIG. 12, a schematic is shown of a custom built ALD tool that was used for QCM studies. A QCM is a sensitive mass balance that measures nanogram to microgram level changes in mass per unit area. This ALD tool included a tube furnace reactor equipped with an in situ quartz crystal microbalance. The components of this ALD tool include mass flow controllers 1 and 2, and bubblers 3, 4, and 5 (available from Swagelok, Nepean, Canada) Each bubbler is connected to a manual valve 15 and a pneumatic valve 14 (available from Swagelok) to a manifold of stainless steel tubing that leads to a reactor 12. Inside the reactor 12 is a chamber which houses the quartz crystal microbalance (QCM) crystal (available from Colnatec, Greenville, SC, USA) and is temperature controlled using a proportional-integral-derivative (PID) controller, 17. On the opposite side of the reactor 12 to where the manifold was attached, there is a splitter 16 with a 6-way cross with ConFlat flanges. Off from the 6-way cross in one direction, is a pressure gauge 13. The splitter also leads to a residual gas analyzer 11, which is attached to a turbo molecular pump 6, and a rotary vane vacuum pump, 7. Off from the 6-way cross is a QCM monitor 10, which is operably connected to a computer. Finally, the splitter is also attached via stainless steel tubing and a cold trap 9 to a rotary vane pump 8.

Figure 13A:
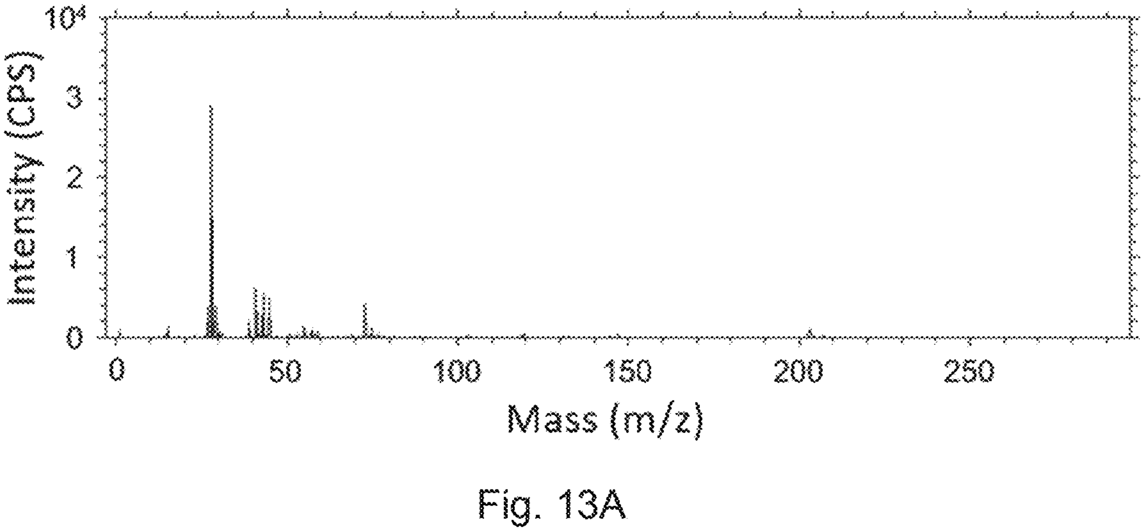
FIG. 13A shows a mass spectra of vacuum annealed $1^{iPr}$ on $SiO_2$ after 12 hours at 170° C., and shows a significant reduction of the NHC $M^+$ ion at 203 m/z.

Referring to FIG. 13A, a mass spectra is shown of vacuum annealed (12 h) $1^{iPr}$ functionalized $SiO_2$ substrate. A significant decrease in the $M^+$ signal at 203 m/z indicated that vacuum annealing successfully removed NHC from the dielectric surface.

Figure 13B:
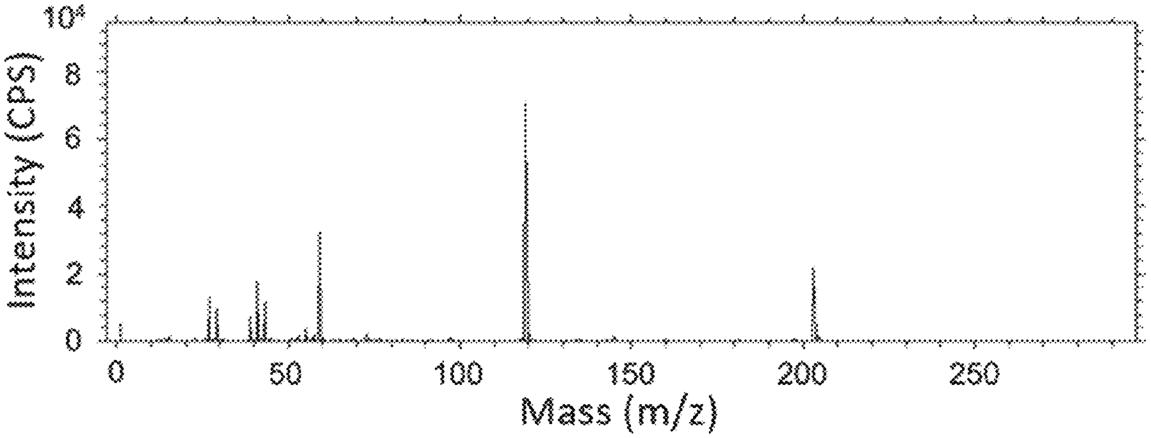
FIG. 13B shows a mass spectra of vacuum annealed $1^{iPr}$ on Co after 12 hours at 170° C., and shows a NHC $M^+$ ion at 203 m/z.

Referring to FIG. 13B, a mass spectra is shown of vacuum annealed (12 h) $1^{iPr}$ functionalized Co substrate. Retention of the NHC $M^+$ ion indicated its resistance to removal by vacuum annealing. These results show the increased binding selectivity of the NHC to metal substrates.

Figure 16:
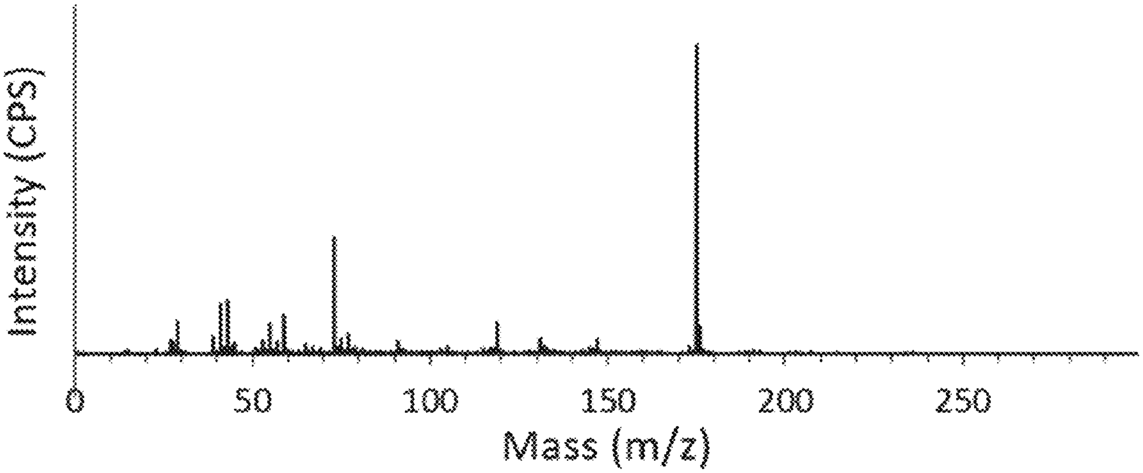
FIG. 16 shows a mass spectra (Intensity vs. Mass) of deposited $3^{Et}$ on Co and shows molecular ion $3^{Et+}$ at 175 m/z.

Referring to FIG. 16, a mass spectra is shown of deposited $3^{Et}$ on Co and shows a peak for $3^{Et+}$ ion at 175 m/z. The presence of this peak indicates that NHC was indeed present on the Co substrate.

Vapour pressure and thermal stability of NHCs $1^{iPr}$ and $2^{tBu}$ have been measured and found to be low enough to be introduced into the ALD chamber at room temperature. This facilitates deposition, and lowers cost. NHC monolayers of $1^{iPr}$ have been prepared on copper substrates by room temperature pulses of 10 seconds each, delivering up to 240 μg of NHC/s, which is considerably more than required for industry processes.

The following working examples further illustrate the invention and are not intended to be limiting in any respect.

WORKING EXAMPLES

All synthetic reactions were conducted under air unless otherwise stated. Solvents were used without purification except where stated. Unless otherwise noted, chemicals were purchased from chemical suppliers at highest purity and used as received. $N_2$ was 99.999% pure unless stated otherwise and was available from Praxair. Amberlyst A26 hydroxide resin was activated by sparging a solution with $CO_2$ for 30 minutes before use as the $HCO_3$ resin. $^1H$ and $^{13}C\{^1H\}$ NMR spectra were recorded at Queen's University using Bruker Avance-400 or 700 MHz spectrometers at 298 K. Chemical shifts (δ) are reported in parts per million (ppm) and are internally referenced to residual protonated ($^1H$) or deuterated ($^{13}C\{^1H\}$) solvent signals, which are themselves set relative to $Si(CH_3)_4$. Chemical shifts of known solvent impurities were referenced to the literature. Coupling constants (J) are reported in Hz as absolute values. All NMR data were processed and displayed using Bruker TopSpin or MestReNova software programs. Elemental analyses were performed at Queen's University using Flash 2000 CHNS—O analyzer. Electrospray ionization mass spectra (ESI-MS) of small molecules were recorded at Queen's University using a Thermo Fisher Orbitrap Velos-Pro mass spectrometer with a heated-electrospray ionization probe.

XPS spectra were recorded on a Kratos Nova AXIS spectrometer equipped with AlN X-ray source. Samples were mounted on an aluminum sample holder using double-sided adhesive copper tape and kept under high vacuum ($10^{-8}$ Torr) overnight inside the preparation chamber before being transferred to the analysis chamber (ultra-high vacuum, $10^{-10}$ Torr).

Data were collected using Al Kα radiation operating at 1486.69 eV (150 W, 15 kV), charge neutralizer and a delay-line detector (DLD) consisting of three multichannel plates. Acquired data were processed using CasaXPS software following reference handbooks. Processed data were plotted in Python using Matplotlib package. Elemental compositions of samples were evaluated by running widescan at 160 eV pass energy. After peak identification, high resolution scans were performed for O 1 s, C 1 s, N 1 s, and substrate of interest regions. These scans were performed at 20 eV pass energy. C 1 s spectra were peak fitted following guidelines from reference handbooks and C—C/C—H peak was charge corrected to 248.8 eV. Unless otherwise mentioned, a Shirley type background correction was used for all spectra shown here.

Deposition and characterization studies of the resultant films (e.g., XPS, ToF-SIMS) were conducted. Depositions were carried out in a standard Picosun R200 thermal ALD tool. Depositions were standard pulse-purge cycles (e.g, 100 cycles; 10 s pulse NHC, 10 s $N_2$ purge, with various substrates. Durability studies of monolayer deposition films were conducted a custom thermal ALD tool (see FIG. 12 for a schematic).

Example 1. Preparation of 1,3-diisopropyl-5-(trifluoromethyl)-1H-benzimidazolium bicarbonate

Example 1A. Preparation of 5-(Trifluoromethyl)-1H-benzimidazolylidene

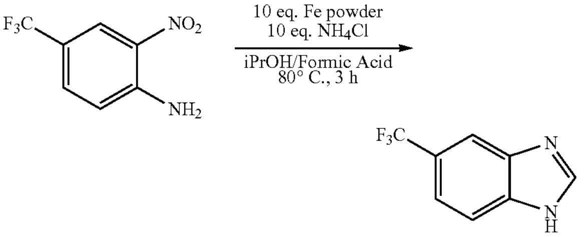

5-(Trifluoromethyl)-1H-benzimidazolylidene: Synthesis of 5-(trifluoromethyl)-1H-benzimidazolylidene was modified from a published procedure of a similar compound.[7] 2-nitro-4-trifluoromethylaniline (5.000 g, 24.25 mol, 1 eq.) and ammonium chloride (12.97 g, 242.5 mol, 10 eq.) were dissolved in 2-propanol (160 mL). Iron powder (13.54 g, 242.5 mol, 10 eq) was added followed slow addition of Formic acid (190 mL). The reaction mixture was heated to 80° C. for 3 hours. Following, the reaction mixture was then filtered and concentrated to dryness. Saturated sodium bicarbonate solution was added to the flask until a pH of 6 was reached. Aqueous solution was extracted with ethyl acetate (3×50 mL) and the organic layers were dried over sodium sulfate. The organic layer was filtered, and volatiles removed by rotatory evaporation. An off-white solid was obtained after drying under vacuum. (78%, 3.450 g)

$^1H$ NMR ($CDCl_3$, 300 MHz): δ 8.4 (s, 1H) 8.2 (s, 1H), 7.9 (s, 1H), 7.7 (d, J=8.1 Hz, 1H), 7.5 (d, J=8.2 Hz, 1H). $^{19}F$ NMR ($CDCl_3$, 500 MHz): δ −60.2.

Example 1 B. Preparation of 1,3-Diisopropyl-5-(trifluoromethyl)-1H-benzimidazolium iodide

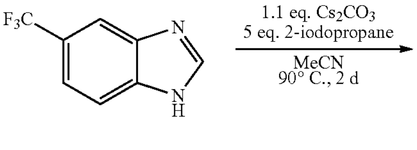

-continued

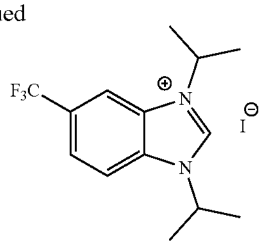

1,3-Diisopropyl-5-(trifluoromethyl)-1H-benzimidazolium iodide: Synthesis of 1,3-diisopropyl-5-(trifluoromethyl)-1H-benzimidazolium iodide was modified from a published procedure of a similar compound (Crudden, C. M., et al., U.S. Patent Application Publication No. 20160199875). Cesium carbonate (1.925 g, 26.86 mol, 1.1 eq) and 5-(trifluoromethyl)-1H-benzimidazolylidene (1.000 g, 5.373 mol, 1 eq.) were stirred in acetonitrile (25 mL) under argon atmosphere. 2-Iodopropane (4.566 g, 26.86 mol, 5 eq.) was added via syringe and the reaction was heated to 90° C. for 2 days. After the reaction mixture was allowed to cool and volatiles were removed by rotary evaporation. The solid was then dissolved in dichloromethane (30 mL) and filtered through Celite pad. The solvent was removed by rotary evaporation, yielding a white powder (70%, 1.536 g) of 1,3-Diisopropyl-5-(trifluoromethyl)-1H-benzimidazolium iodide.

$^{1}$H NMR ($CDCl_3$, 300 MHz): δ 11.2 (s, 1H), 8.0 (s, 1H), 7.9 (d, J=9.1 Hz, 1H), 7.9 (d, J=8.7 Hz, 1H), 5.2 (m, 2H), 1.9 (dd, J=6.7, 4.1 Hz, 12H). $^{19}$F NMR ($CDCl_3$, 500 MHz): δ −61.1.

Example 1C. Preparation of 1,3-Diisopropyl-5-(trifluoromethyl)-1H-benzoimidazolium bicarbonate

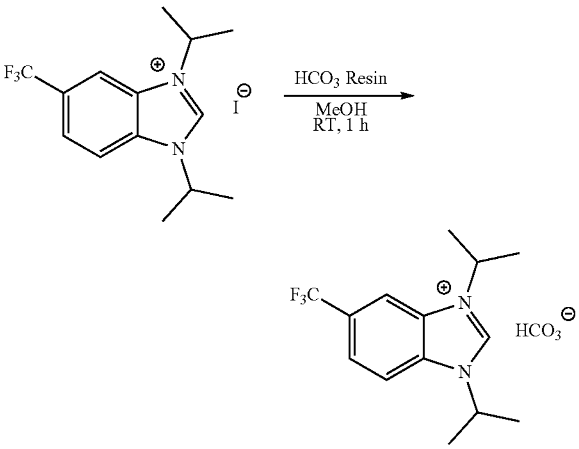

1,3-Diisopropyl-5-(trifluoromethyl)-1H-benzoimidazolium bicarbonate: The synthesis of 1,3-diisopropyl-5-(trifluoromethyl)-1H-benzimidazolium bicarbonate was modified from a published procedure of a similar compound (Crudden, C. M., et al., U.S. Patent Application Publication No. 20160199875). To a 20 mL scintillation vial, 1,3-diisopropyl-5-(trifluoromethyl)-1H-benzimidazolium iodide (0.50 g, 1.26 mmol, 1 eq.) was dissolved in methanol (4 mL). This solution was added to activated $HCO_3$ resin in another 20 mL scintillation vial. The reaction mixture was stirred for 1 hour. Following this, the resulting suspension was filtered through a cotton plug, and concentrated under air to dryness. An obtained solid was then dissolved in acetone (4 mL) and added dropwise to diethyl ether (6 mL). Sonication precipitated out a solid, which was filtered and washed with diethyl ether (4 mL), yielding 1,3-Diisopropyl-5-(trifluoromethyl)-1H-benzoimidazolium bicarbonate ($1^{iPr}$-$CF_3$·$HCO_3$) as a white powder (64%, 0.2769 g).

$^{1}$H NMR ($CD_3OD$, 300 MHz): δ 8.5 (s, 1H), 8.2 (d, J=8.7, 1H), 8.0 (d, J=8.8, 1H), 5.16 (m, 2H), 1.7 (dd, J=6.7, 3.2, 12H). $^{19}$F NMR ($CD_3OD$, 500 MHz): δ −62.4.

Example 2. Deposition of NHCs $1^{iPr}$, $1^{iPr}$-$CF_3$, $2^{iPr}$, and $3^{Et}$ on Cu, Co and/or Ru in an ALD Tool

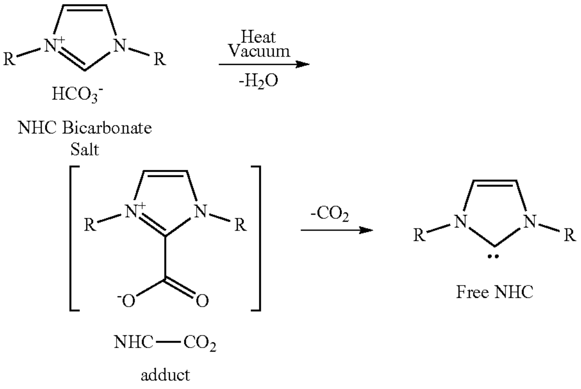

where R is Et, iPr, tBu.

Depositions were performed using a Picosun R200 Advanced Plasma Enhanced Atomic Layer Deposition (PE-ALD) tool (Masala, Finland). Substrates for deposition were placed in the deposition chamber. The chamber was flushed three times with nitrogen gas, wherein the chamber's pressure was raised to 100 hPa then reduced to the deposition pressure of 7 hPa. The deposition chamber was then allowed a 20 min delay once the deposition temperature of 150° C. has been reached, to ensure uniform temperature distribution. A plasma of 5% $H_2$ in Ar mixture was generated at a power of 850 W to prepare and clean the surfaces. The plasma process used 100 cycles of a 12 s plasma pulse and 2 s "rest" pulse where the plasma was turned off. These 100 cycles were immediately followed by 600 cycles of a 0.1 s NHC vapor pulse and 10 s "purge" pulse of nitrogen. The reservoir of NHC precursor was maintained at 90° C. throughout the process. Roughly 50 mg of NHC material was delivered over the course of the 600 cycles. NHC precursor was selected from 1,3-diisopropyl-1H-benzimidazolium bicarbonate ($1^{iPr}$·$HCO_3$); 1,3-diisopropyl-5-(trifluoromethyl)-1H-benzimidazolium bicarbonate ($1^{iPr}$-$CF_3$·$HCO_3$); 1,3-ditertButyl-1H-benzimidazolium bicarbonate ($2^{tBu}$·$HCO_3$); 1,3-diethyl-1H-benzimidazolium bicarbonate ($3^{Et}$·$HCO_3$). These precurors underwent thermolysis and NHC bicarbonate salts converted to NHC carboxylate adducts during heating. After decarboxylation, free NHC in vapor form was obtained: 1,3-diisopropylbenzimidazol-2-ylidene ($1^{iPr}$); 1,3-diisopropyl-5-(trifluoromethyl)benzimidazol-2-ylidene ($1^{iPr}$-$CF_3$); 1,3-ditertbutylbenzimidazol-2-ylidene ($2^{tBu}$); and 1,3-diethylbenzimidazol-2-ylidene ($3^{Et}$). See Table 1 for structural formulae.

Example 3. QCM Studies

All QCM experiments were conducted on a custom low pressure hot walled ALD tool (see FIG. 12) equipped with an in situ quartz crystal microbalance (QCM) (available from Colnatec, EON-LT, Greenville, SC, USA) with a built-in temperature reader. Fresh QCM crystals (6 MHz AT cut coated with optically polished gold) available from Philliptech, Greenville, SC, USA, were mounted onto the QCM stage at the gas inlet to the reactor 1 day prior to experimentation. The reactor was allowed to bake out at deposition temperature with a low flow (5 sccm) of carrier gas ($N_2$) overnight to remove any residual moisture and allow the QCM to equilibrate. Carrier gas lines were heated to the same temperature as the reactor to minimize temperature effects on QCM readings.

NHC precursor was delivered using a pass-through style bubbler to maximize volatilization. The bubbler was loaded in a glovebox with approximately 300 mg of precursor in a 10 mL open-ended beaker and sealed using a 2.75" ConFlat (CF) copper gasket. Bubblers were attached using silver-plated VCR (vacuum coupling radiation) gaskets, and had headspaces evacuated under no-flow (0 sccm), room temperature conditions to control delivery of precursor to the QCM crystal surface.

For saturation experiments, QCM crystals that had equilibrated were exposed to 100 long doses (60 s pulse) of precursor with short (20 s) purge steps using a high (50 sccm) flow rate.

Durability experiments were conducted using the same temperature and flow conditions. Micro-pulses (0.1 s) of room temperature trimethyl aluminum (TMA) were exposed to the NHC coated crystal to test any inhibition on the growth of a TMA coating.

A standard $Al_2O_3$ deposition (0.1 s TMA, 0.1 s $H_2O$, 15 s purges) was completed to test any prolonged inhibition on an industry standard deposition process, and to passivate the chamber interior for future experiments.

Adsorbed areal mass density was derived from the Sauerbrey equation, as follows:

$$\frac{\Delta m}{A} = C\Delta F$$

wherein Δm is change of mass measured;

A is area of quartz crystal;

Δm/A is the change in areal mass density; and

ΔF is change in observed frequency of the crystal's vibration.

The conversion factor C is:

$$C = -\frac{\sqrt{\rho\mu}}{2f_0^2}$$

wherein density of a quartz crystal ($\rho_q$) was 2.648 g $cm^{-3}$, shear modulus of an AT-cut crystal ($\mu_{AT}$) was 2.947*$10^{11}$ g $cm^{-1}$ $s^{-2}$, and resonant frequency ($f_0$) of 6 MHz.

$$C = -\frac{\sqrt{\left(2.648\frac{g}{cm^3}\right)\left(2.947*\frac{10^{11}g}{cms^2}\right)}}{2(6\text{ MHz})^2} = -12.27\frac{ng}{cm^2Hz}$$

These values provided a conversion factor of −12.27 ng $cm^{-2}$ $Hz^{-1}$. QCM studies determined that saturative growth behaviour was seen in the NHC depositions described herein.

Example 4. ToF-SIMS Experiments

ToF-SIMS samples were examined using an ION-TOF (GmbH) ToF-SIMS IV equipped with a Bi cluster liquid metal ion source. A pulsed 25 keV $Bi_3^+$ cluster primary ion beam was used to bombard the sample surface to generate secondary ions with a current of 1 μA. The positive (or negative) secondary ions were extracted from the sample surface, mass separated, and detected via a reflectron-type of time-of-flight analyser. Reflector values for the positive and negative mode were +14V and −38V, respectively. Sample charging was neutralised with a pulsed, low energy electron flood. Ion mass spectra were collected in an area of 500 μm×500 μm at 128×128 pixels with 20 scans. High-resolution imaging spectra were processed on ION-TOF software and normalized to the total yield by a division normalization factor.

The ToF-SIMS data confirmed that substrate selectivity for metals was obtained (see FIGS. 4-7, 14 and 15).

Example 5. Vacuum Annealing Study

Vacuum annealing was carried out using a VWR Symphony Vacuum Oven (VWR, Edmonton, Canada) equipped with an Edwards RV12 Rotary Vane Vacuum Pump. NHC coated patterned substrates (e.g., Ru and $SiO_2$, Co and $SiO_2$, and Cu and $SiO_2$) were placed on a glass dish and introduced into the pre-heated vacuum oven at 170° C. for 12 hours. The heating and cooling cycles were set to 0.5° C./min with a working pressure of 15 Torr. After vacuum annealing, samples were removed from the oven and placed in storage under atmospheric conditions until analysis was conducted. In FIG. 7B, before and after vacuum annealing ToF-SIMS images indicated that the metal/silicon dioxide interface was sharpened by annealing after the NHC was deposited, and that stray metal was removed from the silicon dioxide surface by the two step procedure of NHC functionalization and annealing. A mass spectra is shown in FIG. 13A of vacuum annealed (12 h) $1^{iPr}$ functionalized $SiO_2$ substrate. A significant decrease in the $M^+$ signal at 203 m/z indicated that vacuum annealing successfully removed NHC from the dielectric surface. A mass spectra is shown in FIG. 13B of vacuum annealed (12 h) $1^{iPr}$ functionalized Co substrate. Retention of the NHC $M^+$ ion indicated its resistance to removal by vacuum annealing.

In FIG. 15, before and after vacuum annealing ToF-SIMS images are shown for $3^{Et}$. These studies were conducted as described for $1^{iPr}$ above, but the annealing time for $3^{Et}$ was 1 hour.

These results show the increased binding selectivity of the NHC to metal substrates.

EQUIVALENTS

It will be understood by those skilled in the art that this description is made with reference to certain embodiments and that it is possible to make other embodiments employing the principles of the invention which fall within its spirit and scope.

TABLE 1

| NHC Structures | | |
|---|---|---|
| Abbreviation | Chemical Name | Structure |
| $1^{iPr}$•$HCO_3$ | 1,3-diisopropyl-1H-benzimidazolium bicarbonate | 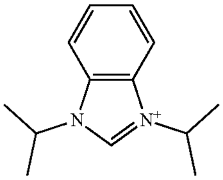 $HCO_3^-$ |
| $1^{iPr}$•RCOO | 1,3-diisopropyl-1H-benzimidazolium alkylcarboxylate | 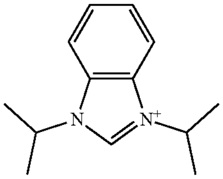 $RCOO^-$ R is an aliphatic moiety |
| $1^{iPr}$•RCOO | 1,3-diisopropyl-1H-benzimidazolium arylcarboxylate | 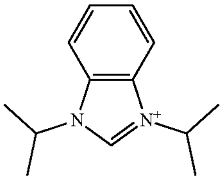 $RCOO^-$ R is an aryl moiety |
| $1^{iPr}$•COO | 1,3-diisopropyl-1H-benzimidazolium carboxylate | 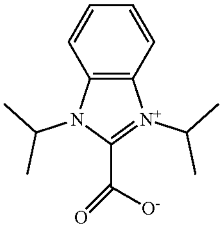 [SMILES: CC(C)n1c(C(=O)[O-])[n+](C(C)C)c2ccccc21] |
| $1^{iPr}$ | 1,3-diisopropylbenzimidazol-2-ylidene | 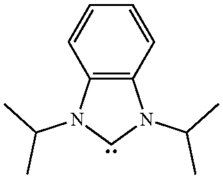 |
| $1^{iPr}$-$CF_3$•$HCO_3$ | 1,3-diisopropyl-5-(trifluoromethyl)-1H-benzimidazolium bicarbonate | 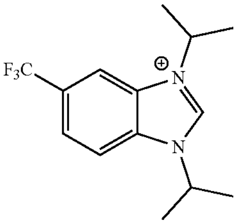 $HCO_3^{\ominus}$ |

TABLE 1-continued

| NHC Structures | | |
|---|---|---|
| Abbreviation | Chemical Name | Structure |
| $1^{iPr}$-$CF_3$•RCOO | 1,3-diisopropyl-5-(trifluoromethyl)-1H-benzimidazolium alkylcarboxylate | 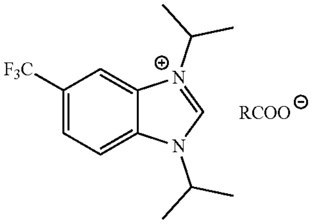 where R is an aliphatic moiety |
| $1^{iPr}$-$CF_3$•RCOO | 1,3-diisopropyl-5-(trifluoromethyl)-1H-benzimidazolium arylcarboxylate | 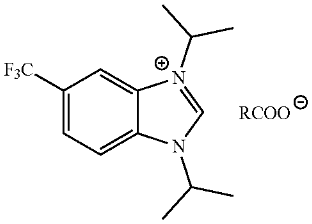 where R is an aromatic moiety |
| $1^{iPr}$-$CF_3$•COO | 1,3-diisopropyl-5-(trifluoromethyl)-1H-benzimidazolium carboxylate | 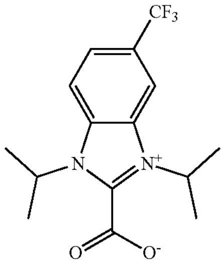 [SMILES: CC(C)n1c(C(=O)[O-])[n+](C(C)C)c2cc(C(F)(F)F)ccc21] |
| $1^{iPr}$-$CF_3$ | 1,3-diisopropyl-5-(trifluoromethyl)benzimidazol-2-ylidene | 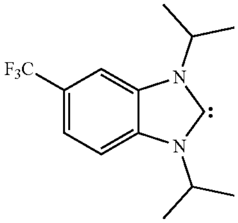 |
| $2^{tBu}$•$HCO_3$ | 1,3-ditertButyl-1H-benzimidazolium bicarbonate | 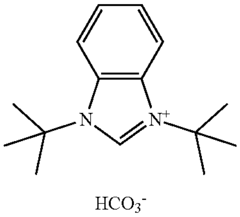 |
| $2^{tBu}$•RCOO | 1,3-ditertButyl-1H-benzimidazolium alkylcarboxylate | 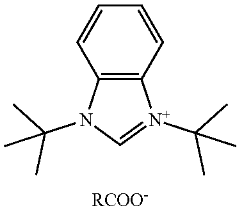 where R is an aliphatic moiety |

TABLE 1-continued

| NHC Structures | | |
|---|---|---|
| Abbreviation | Chemical Name | Structure |
| $2^{tBu}$•RCOO | 1,3-ditertButyl-1H-benzimidazolium acrylcarboxylate | 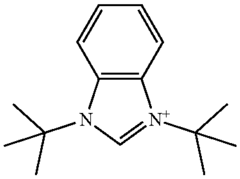 $RCOO^-$ where R is an aromatic moiety |
| $2^{tBu}$•COO | 1,3-ditertButyl-1H-benzimidazolium carboxylate | 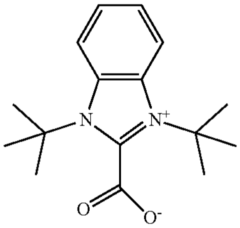 [SMILES: CC(C)(C)n1c(C(=O)[O-])[n+](C(C)(C)C)c2ccccc21] |
| $2^{tBu}$ | 1,3-ditertbutylbenzimidazol-2-ylidene | 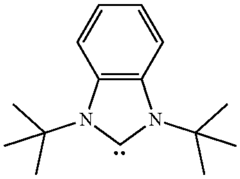 |
| $3^{Et}$•$HCO_3$ | 1,3-diethyl-1H-benzimidazolium bicarbonate | 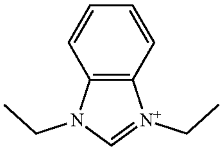 $HCO_3^-$ |
| $3^{Et}$•RCOO | 1,3-diethyl-1H-benzimidazolium alkylcarboxylate | 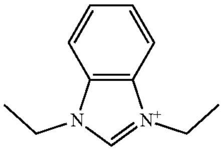 $RCOO^-$ where R is an alphatic moiety |
| $3^{Et}$•RCOO | 1,3-diethyl-1H-benzimidazolium arylcarboxylate | 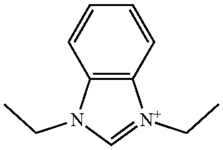 $RCOO^-$ where R is an aromatic moiety |

TABLE 1-continued

NHC Structures

| Abbreviation | Chemical Name | Structure |
| --- | --- | --- |
| $3^{Et}$•COO | 1,3-diethyl-1H-benzimidazolium carboxylate | 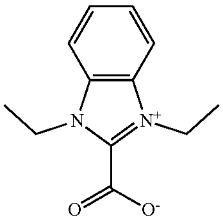 [SMILES: CCn1c(C(=O)[O-])[n+](CC)c2ccccc21] |
| $3^{Et}$ | 1,3-diethylbenzimidazol-2-ylidene | 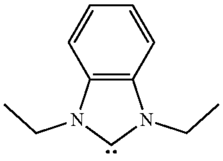 |

We claim:

1. A method of selective deposition, comprising:

disposing a patterned substrate in a deposition chamber, wherein the patterned substrate comprises a metal surface, and a non-metal or metal oxide surface in the absence of a protective surface film, and wherein the deposition chamber comprises a valve-controlled inlet for a carrier gas and a furnace, wherein the carrier gas has valve-controlled access to a bubbler that contains an N-heterocyclic carbene precursor that is an azolium carboxylate zwitterion, or a salt that comprises a benzimidazolium cation and an anion selected from the group consisting of bicarbonate, carbonate, hydrogen carbonate, halide, pseudohalide. triflate, cyanide, azide, carboxylate, alkylcarboxylate, arylcarboxylate, where alkyl is an aliphatic moiety and aryl is an aromatic moiety;

heating and maintaining the bubbler at a sufficiently high temperature to effect thermolysis thereby generating a vapour form of an N-heterocyclic carbene (NHC) that comprises a benzimidazolylidene, and that collects in a headspace of the bubbler;

intermittently pulsing carrier gas that includes the vapour form of NHC into the heated deposition chamber and purging the deposition chamber with carrier gas; and wherein the NHC selectively chemisorbs onto the metal surface, and substantially no NHC chemisorbs onto the non-metal or metal oxide surface.

2. The method of claim 1, wherein the pulsing is performed by opening the gas inlet valve for a selected time for a selected number of cycles.

3. The method of claim 2, wherein the number of cycles is about 100.

4. The method of claim 1, wherein the cleaning the metal surface comprises exposing it to hot plasma.

5. The method of claim 4, wherein the hot plasma is a plasma of $H_2$ at about 400° C.

6. The method of claim 1, wherein the metal surface is thick enough to exhibit bulk properties.

7. The method of claim 1, wherein the metal surface is between 0.5 to 1 000 nm thick.

8. The method of claim 1, wherein the metal surface is between 25 and 150 nm thick.

9. The method of claim 1, wherein the metal surface is about 100 nm thick.

10. The method of claim 1, wherein the sufficiently high temperature is in a range of about room temperature to about 500° C.

11. The method of claim 1, wherein the sufficiently high temperature is in a range of about 30 to about 200° C.

12. The method of claim 1, wherein the deposition chamber is suitable for holding wafers.

13. The method of claim 1, wherein the deposition chamber is suitable for sustaining a vacuum in a range of about 0.1 torr to about 5 torr.

14. The method of claim 1, wherein the deposition chamber is suitable for sustaining a vacuum of about 3 torr.

15. The method of claim 1, wherein the carrier gas is nitrogen or argon.

16. The method of claim 1, wherein the purging the deposition chamber with carrier gas is performed for about 20 seconds.

17. The method of claim 1, wherein the NHC chemisorbs onto the metal surface as a monoloayer.

18. The method of claim 1, wherein the NHC chemisorbs onto the metal surface as a bilayer.

19. The method of claim 1, wherein the NHC chemisorbs onto the metal surface as a multilayer.

20. The method of claim 1, further comprising cooling the deposition chamber to room temperature while continuously purging the deposition chamber with carrier gas.

21. The method of claim 1, wherein the non-metal or metal oxide surface is a dielectric surface.

22. The method of claim 21, wherein the non-metal or metal oxide surface comprises $SiO_2$, $Si_3N_4$, $Al_2O_3$, $Si_wO_xN_y$ wherein w is 0 to 3, x is 0 to 2 and y is 0 to 4, $HfO_2$, or any combination thereof.

23. The method of claim 1, further comprising removal of the NHC by thermal desorption to regenerate a pristine metal surface.

24. The method of claim 1, wherein the NHC is
1,3-diisopropylbenzimidazol-2-ylidene ($1^{iPr}$);
1,3-diisopropyl-5-(trifluoromethyl)benzimidazol-2-ylidene ($1^{iPr}$-$CF_3$);
1,3-ditertbutylbenzimidazol-2-ylidene ($2^{tBu}$); or
1,3-diethylbenzimidazol-2-ylidene ($3^{Et}$).

25. The method of claim 1, wherein the metal surface of the patterned substrate comprises Au, Cu, Ag, Ru, W, Ni, Fe, Mo, Co, Pt, Pd, or an alloy.

26. The method of claim 1, further comprising a step of treating the substrate to refine the interface between the metal surfaces, and the non-metal or metal oxide surfaces.

27. The method of claim 26, wherein the treating the substrate comprises thermal annealing or plasma treatment.

28. The method of claim 1, wherein the N-heterocyclic carbene precursor is:

a salt of 1,3-diisopropylbenzimidazol-2-ylidene ($1^{iPr}$);

a salt of 1,3-diisopropyl-5-(trifluoromethyl)benzimidazol-2-ylidene ($1^{iPr}$-$CF_3$);

a salt of 1,3-ditertbutylbenzimidazol-2-ylidene ($2^{tBu}$); or a salt of 1,3-diethylbenzimidazol-2-ylidene ($3^{Et}$).

29. The method of claim 1, further comprising cleaning the patterned substrate.

30. The method of claim 29, further comprising modifying the temperature of the deposition chamber to a selected deposition temperature if the deposition temperature differs from a temperature of cleaning.

31. The method of claim 1, further comprising evacuating the deposition chamber such that it is under vacuum prior to the deposition of NHC.

32. The method of claim 1, further comprising annealing the substrate after NHC deposition.

33. A method of deposition, comprising:

disposing a substrate in a deposition chamber, wherein the substrate comprises at least a metal surface, and wherein the deposition chamber comprises a valve-controlled inlet for a carrier gas and a furnace, and wherein the carrier gas has valve-controlled access to a bubbler that contains a N-heterocyclic carbene precursor that is an azolium carboxylate zwitterion, or a salt that comprises a benzimidazolium cation and an anion selected from the group consisting of bicarbonate, carbonate, hydrogen carbonate, halide, pseudohalide triflate, cyanide, azide, carboxylate, alkylcarboxylate, arylcarboxylate, where alkyl is an aliphatic moiety and aryl is aromatic;

heating and maintaining the bubbler at a sufficiently high temperature to effect thermolysis thereby generating a vapour form of an N-heterocyclic carbene (NHC) that comprises a benzimidazolylidene, and that collects in a headspace of the bubbler;

intermittently pulsing carrier gas that includes the vapour form of NHC into the deposition chamber and purging the deposition chamber with carrier gas; and wherein the NHC chemisorbs onto the metal surface.

34. The method of claim 33, wherein the metal surface of the substrate comprises Au, Cu, Ag, Ru, W, Ni, Fe, Mo, Co, Pt, Pd, or an alloy.

* * * * *